United States Patent
Unger et al.

(10) Patent No.: US 10,726,373 B1
(45) Date of Patent: Jul. 28, 2020

(54) MANAGING PROOF ASSETS FOR VALIDATING PROGRAM COMPLIANCE

(71) Applicant: Hyperproof Inc., Bellevue, WA (US)

(72) Inventors: Craig Howard Unger, Bellevue, WA (US); Robert Moodie Heddle, Kirkland, WA (US); Andrew Robert Miller, Issaquah, WA (US); David John Brennan, Redmond, WA (US); Alexander Vorobiev, Mercer Island, WA (US)

(73) Assignee: Hyperproof Inc., Bellevue, WA (US)

( * ) Notice: Subject to any disclaimer, the term of this patent is extended or adjusted under 35 U.S.C. 154(b) by 0 days.

(21) Appl. No.: 16/436,845

(22) Filed: Jun. 10, 2019

(51) Int. Cl.
G06Q 10/10 (2012.01)
G06Q 10/06 (2012.01)
G06F 16/93 (2019.01)

(52) U.S. Cl.
CPC ......... G06Q 10/0633 (2013.01); G06F 16/93 (2019.01); G06Q 10/10 (2013.01)

(58) Field of Classification Search
CPC .......................... G06Q 10/0633; G06F 16/93
See application file for complete search history.

(56) References Cited

U.S. PATENT DOCUMENTS

| | | | |
|---|---|---|---|
| 2003/0126002 A1* | 7/2003 | Jackson | G06Q 10/0631 705/7.12 |
| 2007/0226721 A1* | 9/2007 | Laight | G06Q 10/06 717/154 |
| 2008/0222631 A1* | 9/2008 | Bhatia | G06F 11/3604 717/178 |
| 2008/0282228 A1* | 11/2008 | Subramanyam | G06F 8/20 717/121 |
| 2009/0171741 A1* | 7/2009 | Bishop | G06Q 10/06 705/7.37 |
| 2009/0228337 A1* | 9/2009 | Swindon | G06Q 10/10 705/7.32 |

(Continued)

OTHER PUBLICATIONS

Office Communication for U.S. Appl. No. 14/326,661 dated May 15, 2019, pp. 1-13.

(Continued)

*Primary Examiner* — Sujay Koneru
(74) *Attorney, Agent, or Firm* — John W. Branch; Lowe Graham Jones PLLC

(57) ABSTRACT

A program model that includes requirements and control objects associated with requirements, workflows, proof assets. Workflow tasks associated with the workflows may generate requests to collect each proof asset associated with the control objects. Workflow tasks may validate each collected proof asset based on the plurality of control objects associated with each collected proof asset. Workflow tasks may determine completed control objects based on the validated proof assets. Workflow tasks may employ an amount of the completed control objects that is equivalent to the amount of the control objects associated with the program model to provide a report indicating that the requirements associated with the program model may be satisfied. Workflow tasks may employ detection of modifications to the validated proof assets to determine a portion of the workflow tasks based on the modified proof assets such that the portion of the workflow tasks may be re-executed.

30 Claims, 17 Drawing Sheets

(56) References Cited

U.S. PATENT DOCUMENTS

| | | | |
|---|---|---|---|
| 2011/0196804 A1* | 8/2011 | Sutter | G06Q 10/0832 |
| | | | 705/332 |
| 2014/0222451 A1* | 8/2014 | Hall | G06F 19/00 |
| | | | 705/2 |
| 2014/0280300 A1* | 9/2014 | Ottenfelt | G06Q 10/0633 |
| | | | 707/769 |
| 2017/0249644 A1* | 8/2017 | DiMaggio | G06Q 30/018 |
| 2018/0107769 A1* | 4/2018 | Kumar | G06F 17/18 |
| 2018/0174061 A1* | 6/2018 | Harvey | G06N 5/04 |
| 2019/0147403 A1* | 5/2019 | Lawrence | G06Q 10/107 |
| | | | 705/1.1 |

OTHER PUBLICATIONS

Office Communication for U.S. Appl. No. 13/715,476 dated Feb. 1, 2019, pp. 1-17.

* cited by examiner

```
702 ─▶ { "control" : {
           "id": "3333",
           "name": "New Employee",
704 ─▶     "status": {
              "satisfied" : false,
              "approved": false
           },
706 ─▶     "workflow": [ "collect": "offer-letter",   ◀─ 708
                         "collect": "background-check",
               710 ─▶    "collect": {"asset":"2019-w-9",
                                     "asset":"employment-agreement"
                                    }
                        ],
712 ─▶     "owner" : "jane.smith@jane.smith",
714 ─▶     "asset_catalog":[
              { "id": "12345.1234",
                "class": "offer-letter",
                "description": "Offer Letter",
                "approver": "eric.jones@eric.jones",
716 ─▶        "status": "approved"
              },
              { "id": "12345.1256",
                "class": "background-check",
                "description": "Background Check",
                "approver": "eric.jones@eric.jones",
                "status": "approved"
              },
              { "id": "12299.99",  ◀─ 718
                "class": "employment-agreement",
                "description": "Employment Agreement",
                "approver": "eric.jones@eric.jones",
                "status": "approved"
              },
              { "id": null,  ◀─ 720
                "class": "2019-w-9",
                "description": "2019 W-9",
                "approver": "automatic",
                "status": "missing"
              }
           ]
    }
```

*Fig. 7*

```
802 ─→ { "program-model" : {
            "name" : "ABC Compliance Program",
            "owner" : "frank.smith@frank.smith",
804 ─→      "workflow" : [
806 ─→         "action" : "kickoff-meeting",
808 ─→         "requirements" : {
                   [ {"ABC_1.1" : "control_00"},
                     {"ABC_1.2" : "control_01"},
                     {"ABC_1.3" : "control_02"}
                   },
810 ─→             {"ABC_1.4" : "control_03"}
                   ]}
            ]
812 ─→  "status" : {
            "condition":"pending"
        }
    }
```

*Fig. 8*

MANAGING PROOF ASSETS FOR VALIDATING PROGRAM COMPLIANCE

TECHNICAL FIELD

The present invention relates generally to data management, and more particularly, but not exclusively, to managing the data assets used to prove compliance with programs.

BACKGROUND

Increasingly it may be required or otherwise advantageous for organizations to prove to themselves or other that they employ practices that comply with one or more public standards or programs, such as, American Institutes of Certified Public Account's (AICPA's) Service Organization Control 2 (SOC 2), the European Union's General Data Protection Regulation (GDPR), or the like. Proving compliance with such programs may be an expensive or onerous process that consumes time and resources that could better be used elsewhere. In many cases, programs define a set of requirements that each may be associated one or more controls. Organizations typically prove compliance by collecting or generating documentation that indicates that the organization may be complying with the controls or requirements of a given program. In some cases, third party auditors may be engaged to evaluate if an organization's controls meet the requirements of a given program. Managing program compliance efforts for a growing number of standards or programs may become increasingly difficult or expensive for organizations. Thus, it is with respect to these considerations and others that the present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 7 illustrates a representation of a portion of a control object described using JSON in accordance with one or more of the various embodiments;

FIG. 8 illustrates a representation of a portion of a program model described using JSON in accordance with one or more of the various embodiments;

DETAILED DESCRIPTION OF THE VARIOUS EMBODIMENTS

Figure 1:
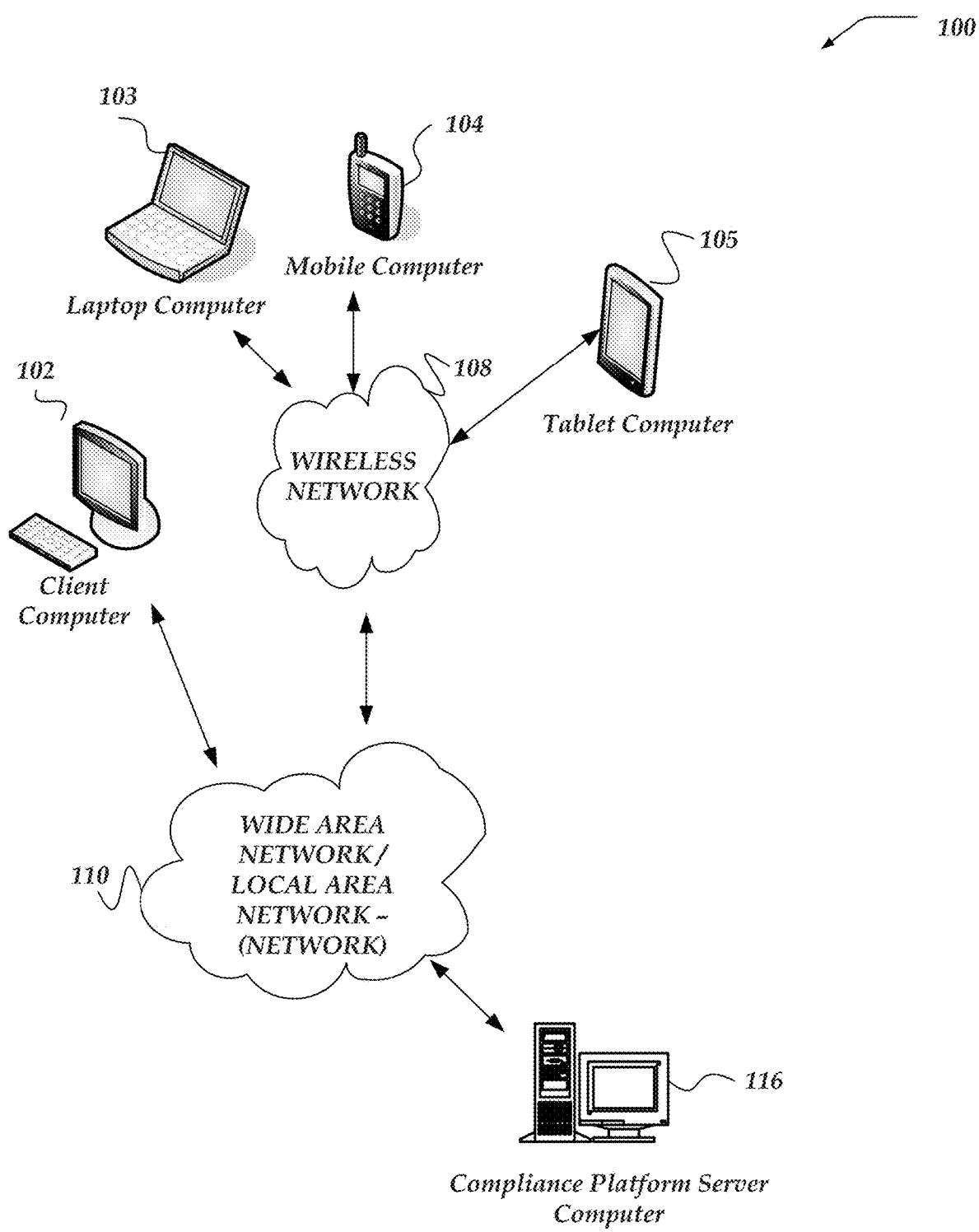
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, Kotlin, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine. Also, in some embodiments, one or more portions of an engine may be a hardware device, ASIC, FPGA, or the like, that performs one or more actions in the support of an engine or as part of the engine.

As used herein, the term "requirement" refers to a set of conditions or assertions associated with various operations of an organization. For example, an organization may have a requirement that new employees receive basic first aid training within one month of being hired.

As used herein, the term "control" refers to refers to a process or policy that is a) designed to ensure that the organization achieves one or more requirements, and b) generates proof artifacts that a third party can use to objectively verify that the control is designed and operating effectively.

For example, if a requirement requires new employees to be trained in basic first aid, a control for this requirement may include obtaining and preserving a copy of a certificate of completion signed by an accredited first aid trainer, or the like.

As used herein, the terms "compliance program," or "program" refer to a set of requirements paired with controls that are directed to proving or otherwise ensuring that an organization is meeting the paired requirement. In some cases, requirements and controls for programs are formalized or published by national or international standards bodies. Often, organizations that implement controls that meet the requirements of a program may publish that they comply with the program.

As used herein, the term "audit" refers to a time-bound review of program compliance activities. Audits may be conducted by internal or external organizations.

As used herein, the term "program model" refers to an arrangement of data structures or processes that implement a compliance program or program. Program models provide the rules or conditions for meeting the requirements or controls for an associated compliance program or program.

As used herein, the term "control object" refers to an arrangement of data structures or processes that implement a control for a requirement. Control objects provide the rules or conditions for meeting an associated requirement. Control objects in a completed state or otherwise satisfied indicate that one or more associated requirements have been met. In some cases, particular control objects may be associated with requirements for a particular compliance program. Also, control objects may be associated with program models. Further, in some cases, control objects may be associated with audits of programs.

As used herein, the term "workflow" refers to an arrangement of data structures or processes that are used to manage or track one or more tasks that may be performed to satisfy a control object.

As used herein, the term "workflow task" refers to an arrangement of data structures or processes that represent a step in a workflow.

As used herein, the term "documents" refers to documentary assets that be associated with a program, control, requirements, or the like. Documents may include files, papers, "office application" documents, signed/executed attestations, recorded web browsing sessions, information provided via web/app forms, text snippets or portions of documents, interview notes, invoices, receipts, declarations, affidavits, survey results, media (video/audio) files, media transcripts, or the like.

As used herein, the term "proof asset" refers to documents, or the like, that may be used to provide evidence that one or more controls may be operating effectively. Proof assets may be collected automatically or provided by users.

As used herein, the term "proof asset catalog" refers to catalog of proof assets that are associated with a control object.

As used herein, the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data using one or more network computers. In one or more of the various embodiments, a program model that includes a plurality of requirements and a plurality of control objects may be provided. In some embodiments, each control object may be associated with one or more of the plurality of requirements, one or more workflows, one or more proof assets, or the like.

In one or more of the various embodiments, one or more workflow tasks associated with the one or more workflows may be executed to generate one or more requests to collect each proof asset that may be associated with the plurality of control objects.

In one or more of the various embodiments, the one or more workflow tasks may be executed to validate each collected proof asset based on one or more of the plurality of control objects that may be associated with each collected proof asset. In one or more of the various embodiments, validating each collected proof asset may include providing one or more collected proof assets to one or more of one or more services or one or more users. And, in some embodiments, validating the one or more collected proof assets based on an approval response from the one or more of one or more services or the one or more users.

In one or more of the various embodiments, the one or more workflow tasks may be executed to determine one or more completed control objects based on the one or more validated proof assets.

In one or more of the various embodiments, the one or more workflow tasks may be executed to employ an amount of the completed control objects that is equivalent to a total amount of the plurality of the control objects to provide a report indicating that the plurality of requirements associated with the program model may be satisfied.

In one or more of the various embodiments, the one or more workflow tasks may be executed to employ detection of one or more modifications to the one or more validated proof assets to determine a portion of the one or more workflow tasks based on one or more modified proof assets such that the portion of the one or more workflow tasks may be executed. or the like.

In one or more of the various embodiments, detection of the one or more modifications to the one or more validated proof assets may include determining a portion of the plurality of control objects that may be associated with one or more modified proof assets based on an asset catalog that may be associated with each of the plurality of control objects.

In one or more of the various embodiments, one or more documents may be collected based on the one or more generated requests such that the one or more documents correspond to one or more requests to collect proof assets. In one or more of the various embodiments, one or more classifiers may be employed to categorize the one or more documents based on one or more characteristics of the one or more documents. And, the one or more documents may be associated with one or more control objects based on the categorization.

In one or more of the various embodiments, one or more control objects may be determined based on one or more characteristics of the plurality of requirements. And, in one or more of the various embodiments, the one or more determined control objects may be included in the plurality of control objects.

In one or more of the various embodiments, the one or more validated proof assets may be stored in a data store. In one or more of the various embodiments, the one or more stored proof assets may be automatically associated with one or more other control objects that may be associated with another program model based on a match of the one or more stored proof assets and the one or more proof assets associated with the one or more other control objects.

In one or more of the various embodiments, one or more monitor tasks that are registered to monitor one or more of one or more conditions or one or more metrics may be executed. In some embodiments, in response to a triggering of a monitor task: one or more control objects that may be associated with the triggered monitor task may be determined. And, in some embodiments, one or more workflow tasks may be executed based on the one or more control objects.

In one or more of the various embodiments, the program model may be determined based on a standards based compliance program that defines the plurality of requirements.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, compliance platform server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, compliance platform server computer 116, or other computers.

Client computers 102-105 may further be configured to include a client application that enables an end-user to log into an end-user account that may be managed by another computer, such as document validation server computer 116, document management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by compliance platform server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, compliance platform server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of compliance platform server computer 116 is described in more detail below in conjunction with FIG. 3. Although FIG. 1 illustrates compliance platform server computer 116 as a single computer, the innovations or embodiments are not so limited. For example, one or more functions of compliance platform server computer 116, or the like, may be distributed across one or more distinct network computers. Moreover, in one or more embodiments, compliance platform server computer 116 may be implemented using a plurality of network computers. Further, in one or more of the various embodiments, compliance platform server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
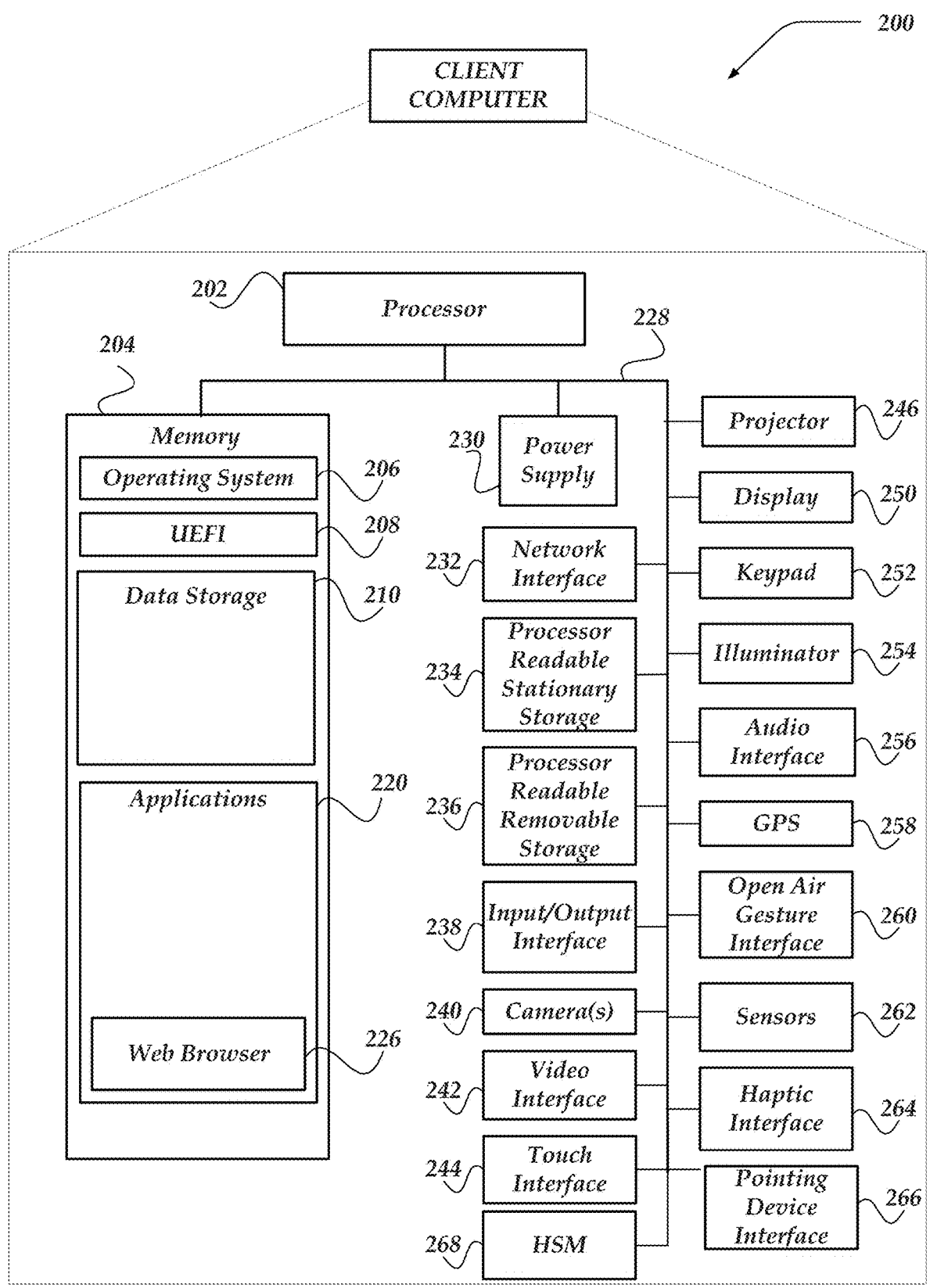
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, client display engine 222, other client apps 224, web browser 226, or the like, may be arranged to employ geo-location information to select one or more localization features, such as, time zones, languages, currencies, calendar formatting, or the like. Localization features may be used in documents, asset classification, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux, or a specialized client computer communication operating system such as Windows Phone™, Android™, or the IOS operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with compliance platform server computers. Also, in one or more of the various embodiments, client computers may be arranged to provide one or more proof assets to one or more compliance platform server computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
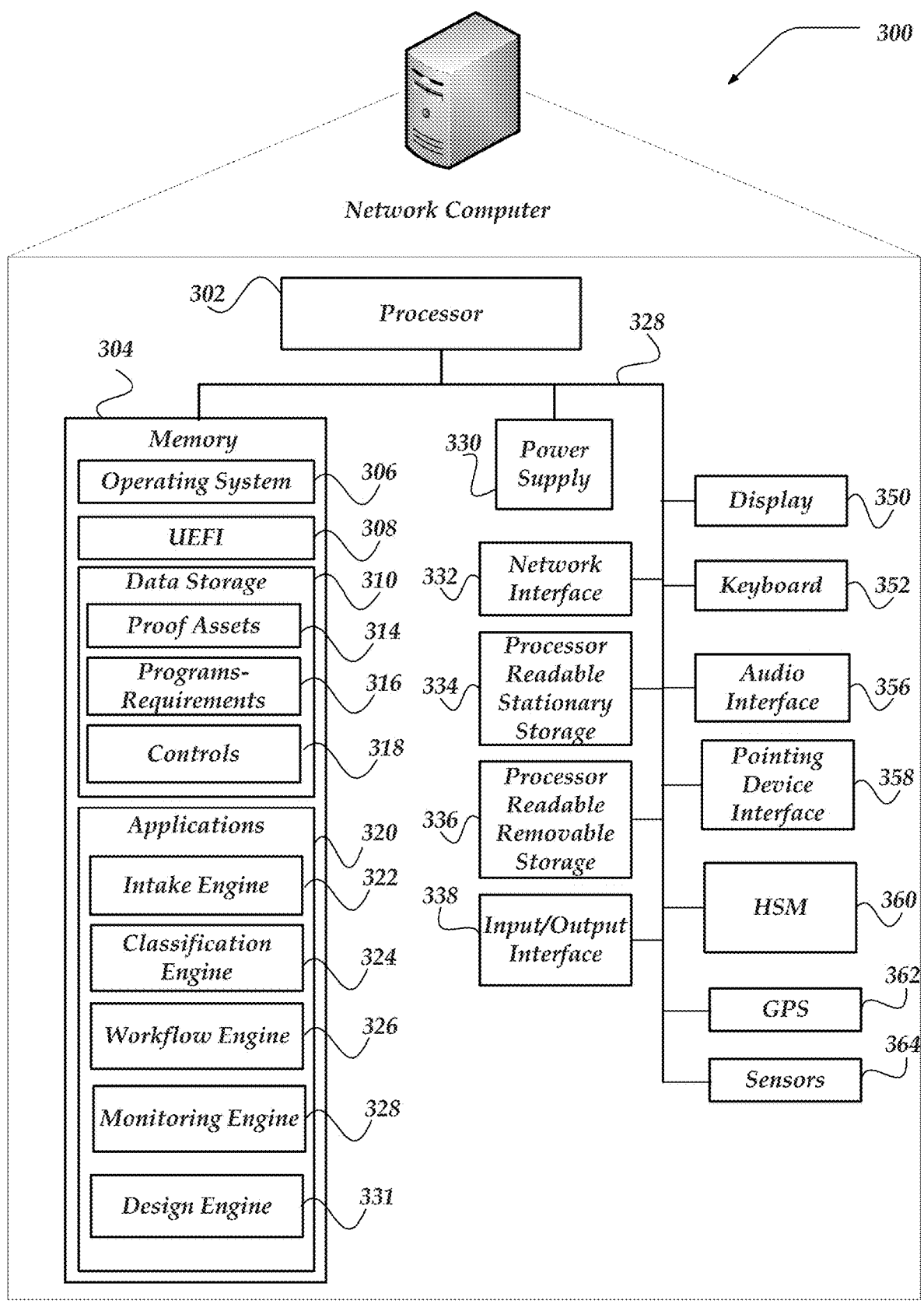
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of one or more compliance platform server computer 116 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as, USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS, or the like), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, intake engine 322, classification engine 326, workflow engine 326, monitoring engine 328, design engine 331, or the like, may be arranged to employ geo-location information to select one or more localization features, such as, time zones, languages, currencies, currency formatting, calendar formatting, or the like. Localization features may be used in documents, file systems, user-interfaces, reports, proof asset classification, visualizations as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, proof assets 314, program-requirements information 316, control information 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include intake engine 322, classification engine 324, workflow engine 326, monitoring engine 328, design engine 331, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, intake engine 322, classification engine 324, workflow engine 326, monitoring engine 328, design engine 331, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to intake engine 322, classification engine 324, workflow engine 326, monitoring engine 328, design engine 331, or the like, may be provisioned and de-commissioned automatically.

Also, in one or more of the various embodiments, intake engine 322, classification engine 324, workflow engine 326, monitoring engine 328, design engine 331, or the like, may be located in virtual servers running in a cloud-based computing environment rather than being tied to one or more specific physical network computers.

Further, network computer 300 may also include hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
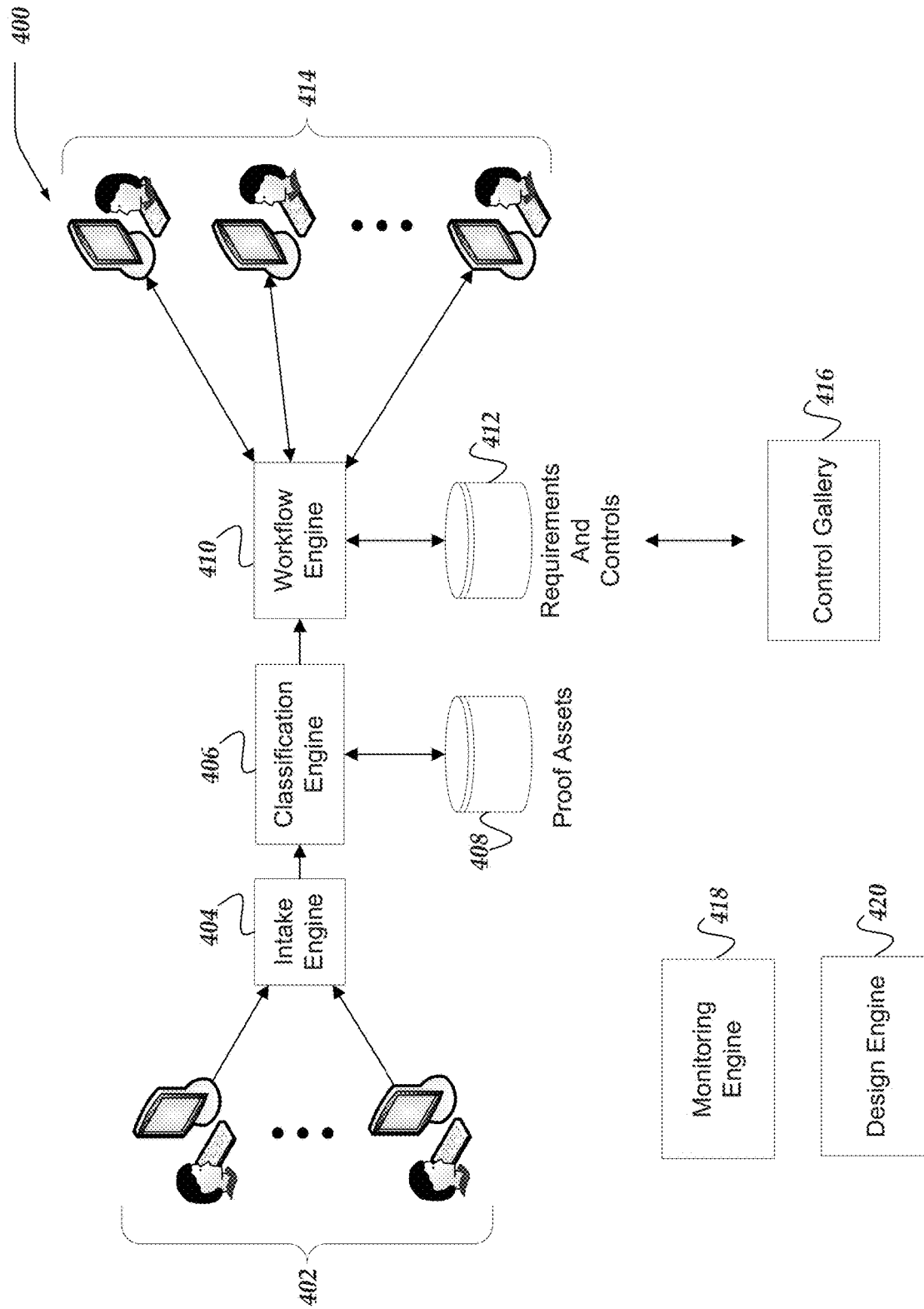
FIG. 4 illustrates a logical architecture of a system for managing proof assets for validating program compliance in accordance with one or more of the various embodiments.

FIG. 4 illustrates a logical architecture of system 400 for managing proof assets for validating program compliance in accordance with one or more of the various embodiments. In some embodiments, system 400 may include various elements, including: one or more proof providers, such as, proof providers 402; one or more intake engines, such as, intake engine 404; one or more classification engines, such as, classification engine 406; one or more proof asset data stores, such as, proof asset data store 408; one or more workflow engines, such as, workflow engine 410; one or more databases for tracking requirements or control objects, such as, database 412; one or more approvers, such as, approvers 414; or the like. In some embodiments, system 400 may include one or more ancillary components, such as, control gallery 416, monitoring engine 418, design engine 420, or the like.

In one or more of the various embodiments, programs may be considered to include one or more requirements that each may associated with a control object. Accordingly, in one or more of the various embodiments, organizations may be enabled to perform actions or provide proof assets that may satisfy the control objects that may be associated with the requirements of the program. By satisfying the control object that is associated with a requirement, an organization may be enabled to prove that it meets that requirement. Accordingly, in some embodiments, if an organization meets the minimum number of requirements for a program, the organization may use the control objects to prove that it is in compliance with the program. In one or more of the various embodiments, requirement information, control objects, or program information may be stored in a data store, such as, database 412.

In one or more of the various embodiments, proof assets may include preexisting documents or documents that may be expressly generated to satisfy one or more control objects. Accordingly, in some embodiments, one or more users may be tasked to provide documents that may show evidence that an organization meets a requirement of a program.

Accordingly, in one or more of the various embodiments, proof providers 402 represent users that may be enabled or tasked to provide proof assets. In some embodiments, proof providers may provide one or more documents to an intake engine, such as intake engine 404. In some embodiments, intake engines may be arranged to provide one or more services that enable proof providers to provide documentary evidence.

In one or more of the various embodiments, intake engines may be arranged to perform some initial pre-processing of provided documents, such as, creating the initial records that may maintain an association of the proof provider that provided the documents. In some embodiments, maintaining a record of the proof assets provided by an individual user enables providers to review or recall the proof assets they have provided. Also, in some embodiments, this association may enable other users to determine the source of proof assets. In some embodiments, source information may include properties, such as, providing user information, network address associated with provider, source of document, geo-location associated with the documents or the document provider, or the like.

In one or more of the various embodiments, if proof assets have been processed by an intake engine 404, the proof assets may be provided to classification engine 406. In one or more of the various embodiments, classification engines may be arranged to automatically analyze proof assets to identify or classify the proof assets based on various characteristics of a given proof asset. In some embodiments, classification engines may be arranged to determine if one or more proof assets may be mapped to one or more control objects with for one or more requirements.

Also, in some embodiments, one or more proof assets may be stored in a tamper resistant proof asset data store, such as, proof asset data store 408.

In one or more of the various embodiments, workflow engines, such as, workflow engine 410 may be arranged to execute one or more workflows that may be associated with proving that an organization is in compliance with one or more programs or one or more requirements.

Accordingly, in one or more of the various embodiments, workflow engines may be arranged to execute workflow tasks that may comprise workflows. In some embodiments, workflow engines may be arranged to employ configuration information associated with control objects to define the tasks that comprise a workflow. In some embodiments, workflows may be associated with particular control objects.

In some embodiments, workflow tasks may include, assigning proof requests to one or more users, setting or updating control object status, confirming proof assets, notifying users about problems, registering the approval or sign-off of one or more actions or proof assets, or the like.

In one or more of the various embodiments, one or more workflow tasks may be arranged to monitor workflow activity by tracking various timelines or deadlines that may be associated with workflows. Accordingly, in one or more of the various embodiments, workflow engines may be arranged to notify supervisors or otherwise escalate priorities if problems may be detected.

In one or more of the various embodiments, users, such as, approvers 414 may be responsible for various intermediate or final approval actions that may be part of workflows. In some embodiments, approval actions may include approving the classification of proof assets, signing off on controls, signing off or approving requirements, signing off or approving various portions of a workflow, approving a change in workflow task status (e.g., advancing to its status from running to complete), acknowledging checkpoints or milestones in a workflow, or the like. Also, in some embodiments, approvers may be enabled to reject proof assets, rollback workflow task status, modify control object status, or the like.

In one or more of the various embodiments, workflow engines may be arranged to automatically determine the users that may be assigned approval actions for control objects. In some embodiments, approval actions for a control object may be associated with a user role. Accordingly, in one or more of the various embodiments, users associated with the relevant role may be assigned approval actions that may be suitable for a particular roles. For example, workflow engines may employ workflow configuration information to determine which approval actions may be associated with which user roles. Further, in some embodiments, workflow configuration information may be arranged to assign particular users to specific approval roles based on the program, requirements, or control objects. For example, in some embodiments, programs may include requirements or controls that are grouped into sections. Accordingly, in some embodiments, one or more users may be assigned approval roles for one or more groups of requirements or controls while one or more other users may be assigned approval roles that enable them to give final approval for an entire section of a program.

In some embodiments, workflow engines may be arranged to assign approval actions based on user activity history or user approval history. For example, in one or more of the various embodiments, if a user has been assigned an approval role in the past, workflow engines may be arranged to assign them approval tasks in the future that may be appropriate for their previous role.

In one or more of the various embodiments, one or more organizations may publish one or more controls in a control gallery, such as, control gallery 416. In one or more of the various embodiments, control galleries may be arranged to enable organizations to share or otherwise publicize one or more controls that they have developed. In some embodiments, this may enable organizations to share some or all of the controls that they have in place for various events or requirements. Accordingly, in some embodiments, other organization may be enabled to incorporate one or more published controls into their own practices. Likewise, in some embodiments, one or more organizations may publish entire programs or portions of programs.

In one or more of the various embodiments, monitoring engines, such as monitoring engine 418 may be arranged to monitor activities or events that may occur in an organization. In some embodiments, monitoring engines may be arranged to execute one or more registered monitor tasks. Accordingly, in some embodiments, if a monitor task is triggered, one or more control objects may be implicated. For example, in some embodiments, monitoring engines may be arranged to monitor activity associated with proof assets that have been used to satisfy control objects. Thus, in this example, for some embodiments, if a proof asset is modified or removed, the monitoring engine may reset the status of control objects that may be associated with the proof assets which may reset one or more requirements to unsatisfied which in turn may insatiate one or more workflows as well.

In one or more of the various embodiments, monitoring engines may be arranged to automatically monitor various systems in an organization based on one or more registered monitors. In some embodiments, monitoring engines may be arranged to provide user interfaces or APIs that may be employed to reset controls or requirements in response to determined or observed triggering activity. For example, for some embodiments, if an organization has a requirement that new employees receive first aid training, the monitoring engine may be arranged to monitor an employee database to determine if new employees have joined the organization. Thus, for this example, a control object associated with the requirement for first aid training may be activated. Here, in this example, control objects may be associated with a workflow that includes scheduling a first aid class for the employee as well as requiring proof assets (e.g., certificate of completion) that show that the new employee has completed the required first aid course. Also, in some embodiments, monitoring engines may provide a user interface that users may use to reset one or more requirements or control objects if an automatic monitor trigger may be unavailable.

Figure 5:
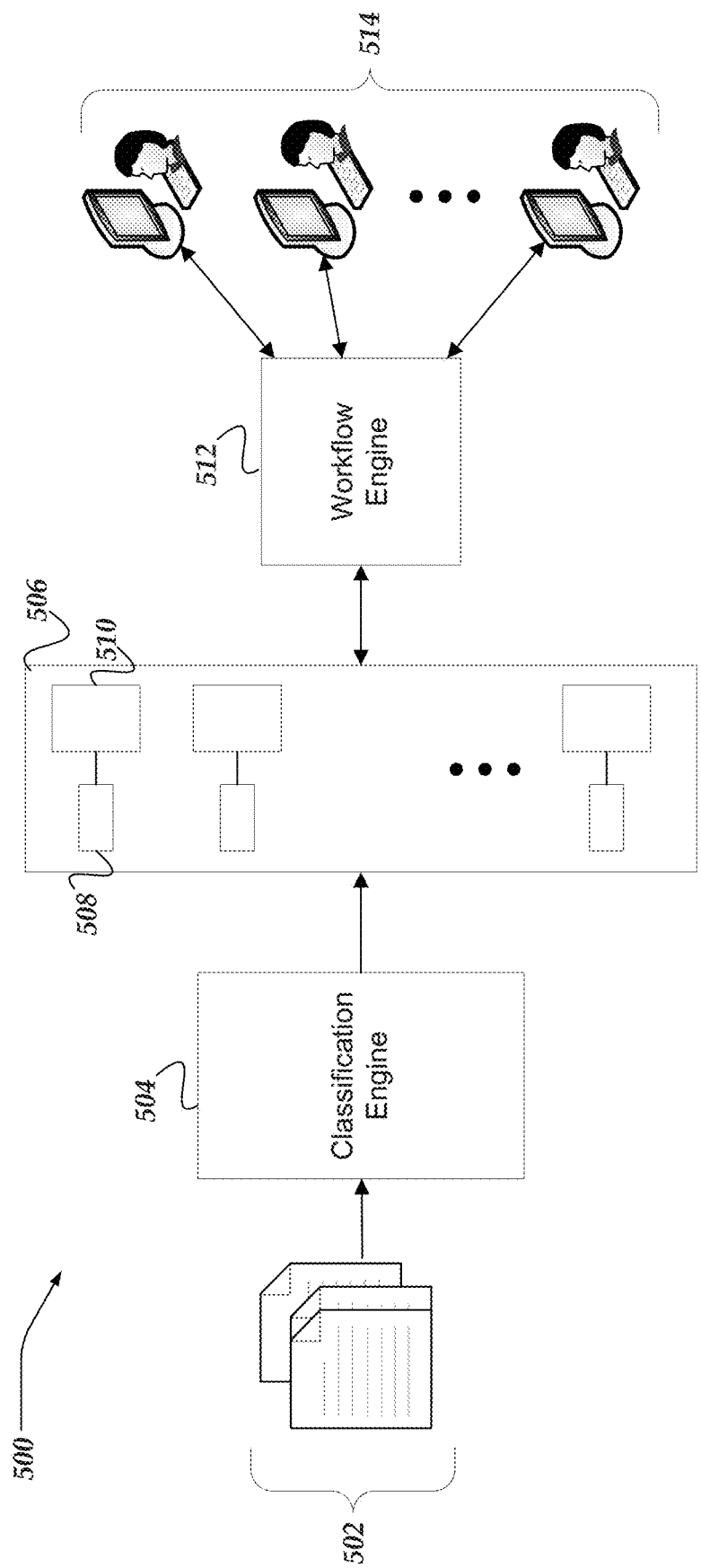
FIG. 5 illustrates a logical schematic of a portion of a system for managing proof assets for validating program compliance in accordance with one or more of the various embodiments.

FIG. 5 illustrates a logical schematic of a portion of system 500 for managing proof assets for validating program compliance in accordance with one or more of the various embodiments. In some embodiments, system 500 may include, proof assets 502, classification engine 504, one or more program models, such as, program model 506 that each may include one or more requirements, such as, requirement 508 that may be associated with a control, such as, control object 510. Also, in some embodiments, system 500 may include workflow engine 512, one or more approvers, such as, approvers 514, or the like.

In one or more of the various embodiments, proof assets, such as, proof assets 502 may be provided to classification engine 504. Accordingly, in some embodiments, classification engines may be arranged to execute one or more classifier processes to evaluate or classify the proof assets based on the characteristics or features of the proof assets. In some embodiments, if proof assets may be classified, they may be associated with one or more control objects, such as, control object 510 that may be associated with one or more program models, such as program model 506.

In one or more of the various embodiments, programs may be comprised of one or more requirements, such as, requirement 508. In some embodiments, each requirement may be associated with a control object, such as, control object 510.

In one or more of the various embodiments, as described below, the one or more control objects may be associated with workflows that may be executed by workflow engine 512.

Figure 6:
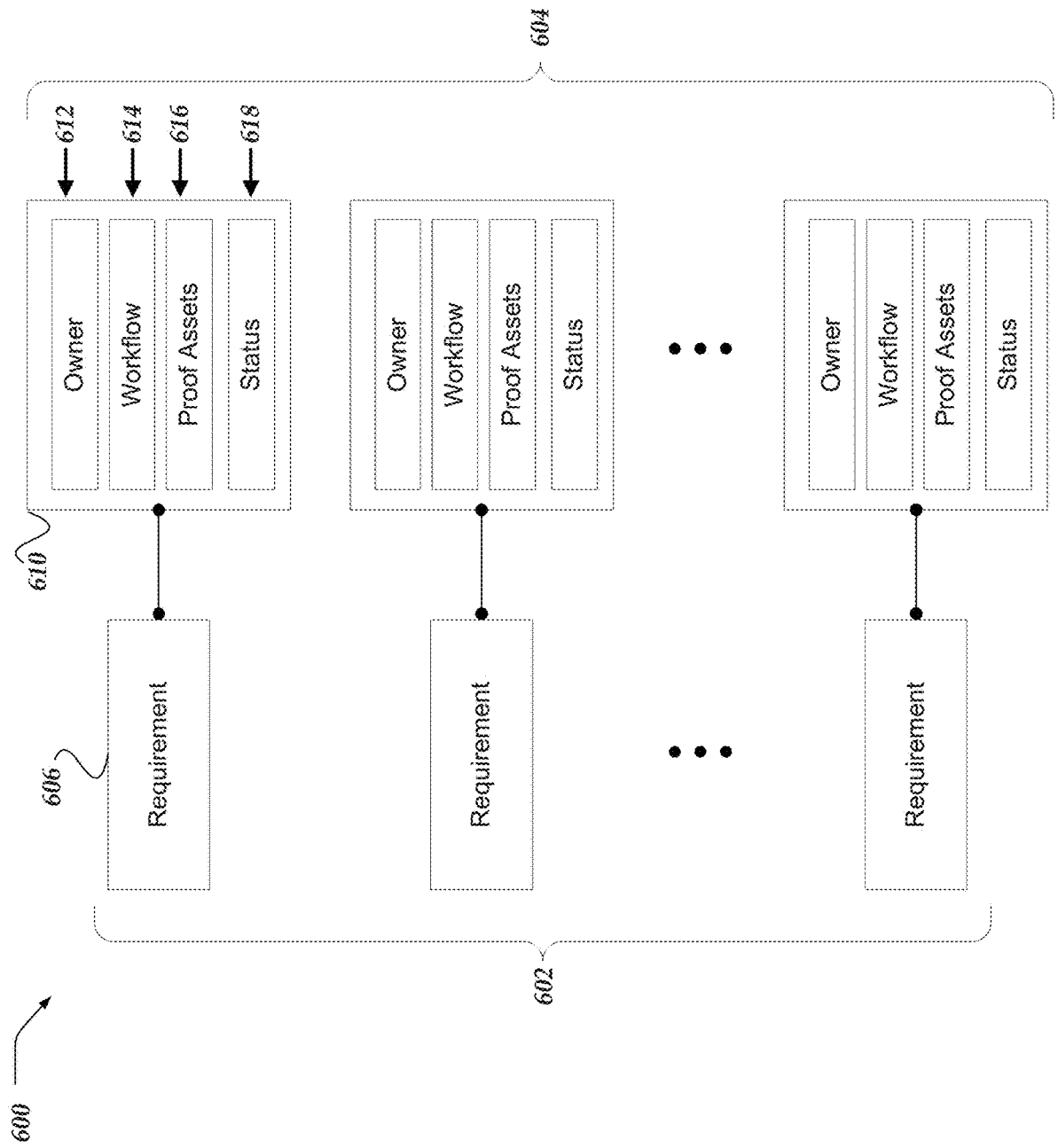
FIG. 6 illustrates a logical schematics of a portion of a program model for managing proof assets for validating program compliance in accordance with one or more of the various embodiments.

FIG. 6 illustrates a logical schematics of a portion of program model 600 for managing proof assets for validating program compliance in accordance with one or more of the various embodiments. In one or more of the various embodiments, program models may be arranged to include various components, including: one or more requirements, such as, requirements 602; one or more control objects, such as, control objects 604, or the like.

In one or more of the various embodiments, requirements may be associated with a control object that determines the actions or proof for determining if the requirement is met. In this example, for some embodiments, requirement 606 may be associated with control object 610.

In one or more of the various embodiments, control objects may be arranged to define the actions that may be performed or the proof assets that may be required to provide provable confirmation that the associated requirement has been met by the organization. In some embodiments, the particular actions or proof assets for controls may be configured to meet the guidelines of a standards based program or an organization's internal program with internal requirements.

Accordingly, in some embodiments, control objects, such as, control object 610 may be arranged to include or reference information, such as, control owner 612, workflow 614, proof asset catalog 616, status information 618, or the like.

In one or more of the various embodiments, control owner 612 may include information that may be sufficient for identifying one or more users that may be responsible for managing the control object. In some embodiments, there may be more than one owner. Likewise, in some embodiments, there may be additional control-level roles, such as, auditors, or the like.

In one or more of the various embodiments, workflow 614 may represent the workflow that may be required to perform the actions to satisfy a control object. In one or more of the various embodiments, workflows may comprised of one or more workflow tasks that describe various actions, such as, collecting proof assets, approving proof assets, or the like.

In one or more of the various embodiments, workflows may be arranged to include one or more workflow tasks that represent actions to be performed or conditions to be met to satisfying the control object. Accordingly, in some embodiments, if a workflow task is executed, it may be arranged to perform one or more actions that may or may not be dependent on another workflow task. In some embodiments, workflow tasks may be arranged to perform various actions, such as: notifying one or more users that a task is in process; requesting proof assets from various proof providers; automatically searching proof asset data stores for relevant proof assets; escalating priority if deadlines are near; deactivating or pausing if a superior workflow task may be rolled back to incomplete, submitting proof assets for further validation or approval; or the like.

In one or more of the various embodiments, one or more workflows or workflow tasks may be arranged to be active processes that may be arranged to be self-realizing such that they may execute computer readable instructions to perform some or all actions. Also, in some embodiments, one or more workflows or workflow tasks may be data oriented containers that may be directly managed by a workflow engine such that the workflow engine performs some or all of the actions and store the results as state information in a workflow tasks container.

In one or more of the various embodiments, proof asset catalog 616 may represent the catalog of proof assets that may be required to satisfy control object 610. In some embodiments, proof assets may be included in proof asset catalog 616 if they have been automatically or manually approved. In some embodiments, including a proof asset in a proof asset catalog may include providing a reference, file path, URI, or other identifiers or location information, that may be employed to identify or locate the proof asset.

In one or more of the various embodiments, status information 618 may represent various status or state information associated with a control object. For example, in some embodiments, status information may include status values that indicate if the control object is in a satisfied state, or the like.

In one or more of the various embodiments, control owners may be given authoritative control or responsibility of the proof assets that may be associated with the control objects that they may control. Accordingly, in some embodiments, a compliance platform may be arranged to enable control owners to grant or deny access rights to proof assets. Also, in one or more of the various embodiments, control owners may be enabled to interact with external users, such as, external auditors. Accordingly, in some embodiments, control owners, at their discretion, may be enabled to share some or all proof assets that may be associated with the control object under their control to external users. In some embodiments, control owners disposed between the external users/auditors and the proof asset at least mitigates a tremendous concern for organizations that may be have concern about sharing too much internal information with auditors without adding additional process overhead or separate tools to communicate freely with other users within their organization.

Also, one of ordinary skill in the art will appreciate that additional information may be associated with programs, requirements, control objects, workflows, or the like, such as, other users (e.g., proof providers), timeline/deadline information, control group or control section membership, historical information, version information, change history, or the like.

FIG. 7 illustrates a representation of a portion of control 700 described using JSON in accordance with one or more of the various embodiments. As described above, control objects may be implemented or represented using various data structures, computer languages, data formats, or the like. In this example, control 700 is represented using JSON. Accordingly, in this example, control object 702 includes various properties for managing or representing its state or status. In this example, control object 702 has "id" and "name" properties which may be used to index or reference control object 702.

In some embodiments, control objects may be associated with properties, such as, status property 704 ("status") for representing the global or overall status/state of the control object.

As described above, controls may be associated with workflows that determine the actions or proof assets that may be required to satisfy a control. In this example, workflow property 706 defines a simplified workflow for control object 702.

In this example, control object 702 represents a portion of a control for meeting an organization's established requirements for hiring a new employee. Accordingly, in this example, workflow property 706 is represented as an ordered list (JSON array) of workflow tasks that should be performed if a new employee is hired. Thus, in this example, workflow 706 includes three workflow tasks that may be associated with hiring a new employee. In this example, the three tasks are related to collecting proof assets that provide evidence that the new hire requirements are met. Accordingly, in this example, workflow task 708 may indicate that a proof asset that shows that an offer letter was provided to the new employee should be collected. In this example, this task may be satisfied by obtaining a copy of the signed offer letter.

In one or more of the various embodiments, one or more workflow tasks may be arranged to be sequential. In this example, the sequencing of workflow tasks may be represented using JSON arrays. Similarly, in this example, workflow tasks that may be performed in parallel may be represented by non-ordered associative maps. Accordingly, in this example, workflow task 708 is a first task in an ordered list of tasks, so it must be complete before other tasks are started. In contrast, in this example, workflow task 710 represents a collection of other workflow tasks that may be performed in parallel. Also, in this example, for some embodiments, workflow task 710 may be consider unfinished or incomplete until each workflow task in the collection is completed.

Additionally, in this example, owner property 712 references a user or users that may be responsible for the control. In this example, the owner of the control may be the one or more users that are responsible for the control. In some embodiments, there may be more than one owner. Likewise, in some embodiments, there may be additional control-level roles, such as, auditors, or the like.

In one or more of the various embodiments, as described above, often controls may be associated with one or more proof assets that may provide evidence that a requirement has been met. Accordingly, in some embodiments, controls may be associated with a proof asset catalog that may be arranged to include information about the required proof assets. In this example, asset catalog 714 represents an asset catalog for control 700. In this example, workflow property 706 defines a workflow that includes collecting four documents related to hiring a new employee. Accordingly, in this example, asset catalog 714 includes entries for each proof asset required by the workflow.

In one or more of the various embodiments, asset catalog entries may include additional meta-data for tracking the location or status of proof assets. Also, in some embodiments, asset catalog entries may be arranged to include various information, such as, document identifiers, asset category, asset class, user friendly description text, authorized approvers, or the like. In this example, proof asset status 716 indicates that the proof asset has been received and approved.

In one or more of the various embodiments, proof assets may be associated with identifiers, such as, asset id 718 that may be employed to reference or index proof assets that may be stored in an asset repository. Accordingly, in one or more of the various embodiments, the same proof asset may be referenced by different controls. Further, in this example, asset id 720 has a value of null indicating that a qualifying proof asset has been not received or associated with control 700.

Note, the example of control 700 is expressed in JSON-style format to further clarify one or more features of at least one of the various embodiments. These embodiments may be implemented using functions, methods, data structures, variable names, control structures, or the like, other than those shown above. In some embodiments, the low-level architecture or programming for providing controls may be different than the examples shown above. For example, one of ordinary skill in the art will appreciate that the innovations disclosed herein may be implemented or represented using various low-level architectures or programming styles, such as, functional programming, imperative programming, object-oriented programming, or the like, or combination thereof. Further, one of ordinary skill in the art will appreciate that one or more embodiments may be implemented using various computer programming languages, such as, Python, Perl, C, C++, C #. Java, JavaScript, Haskell, Clojure, custom languages, or the like, or combination thereof. Likewise, in some embodiments, controls may be represented using various data formats, such as, JSON, XML, YAML, custom formats, directly programmed, or the like. Further, in some embodiments, some or all of the characteristics of control 700 may be implemented using embedded logic hardware devices, such as, Application Specific Integrated Circuits (ASICs), Field Programmable Gate Arrays (FPGAs), Programmable Array Logic systems (PAL), or the like.

FIG. 8 illustrates a representation of a portion of program 800 described using JSON in accordance with one or more of the various embodiments. As described above, program models may be implemented or represented using various data structures, computer languages, data formats, or the like. In this example, program model 802 is represented using JSON. Accordingly, in this example, program model 802 includes various properties for managing or representing its state or status.

In this example, program model 802 may be arranged to include one or more workflows, such as, workflow 804 that includes one or more workflow tasks, such as workflow task 806. In this example, workflow task 806 represents that a kick off meeting is the first action that should take place. For example, the kick-off meeting may where/when an organization performs preliminary administrative actions, such as, assigning user roles or user responsibilities (e.g., approvers, auditors, owners, or the like) before working through the requirements or controls of the program.

In this example, requirements for program model 802, such as, requirements 808 may be included in the workflow 808 as a workflow task that includes workflow tasks that represent the different controls for the program. In this example, workflow task 810 represents a mapping of a specific requirement for program model 802 to a particular control object.

In one or more of the various embodiments, program models may include various properties that may represent various identifier, status, or state information associated with a particular instance of a program model. In this example, property 812 represents a portion of the status or state information for program model 802.

Note, the example of program model 802 is expressed in JSON-style format to further clarify one or more features of at least one of the various embodiments. These embodiments may be implemented using functions, methods, data structures, variable names, control structures, or the like, other than those shown above. In some embodiments, the low-level architecture or recommended implementation of controls may be different than the examples shown above. For example, one of ordinary skill in the art will appreciate that the innovations disclosed herein may be implemented or represented using various low-level architectures or programming styles, such as, functional programming, imperative programming, object-oriented programming, or the like, or combination thereof. Further, one of ordinary skill in the art will appreciate that one or more embodiments may be implemented using various computer programming languages, such as, Python, Perl, C, C++, C #. Java, JavaScript, Haskell, Clojure, custom languages, or the like, or combination thereof. Likewise, in some embodiments, controls may be represented using various data formats, such as, JSON, XML, YAML, custom formats, directly programmed, or the like. Further, in some embodiments, some or all of the characteristics of program model 802 may be implemented using embedded logic hardware devices, such as, Application Specific Integrated Circuits (ASICs), Field Programmable Gate Arrays (FPGAs), Programmable Array Logic systems (PAL), or the like.

Figure 9:
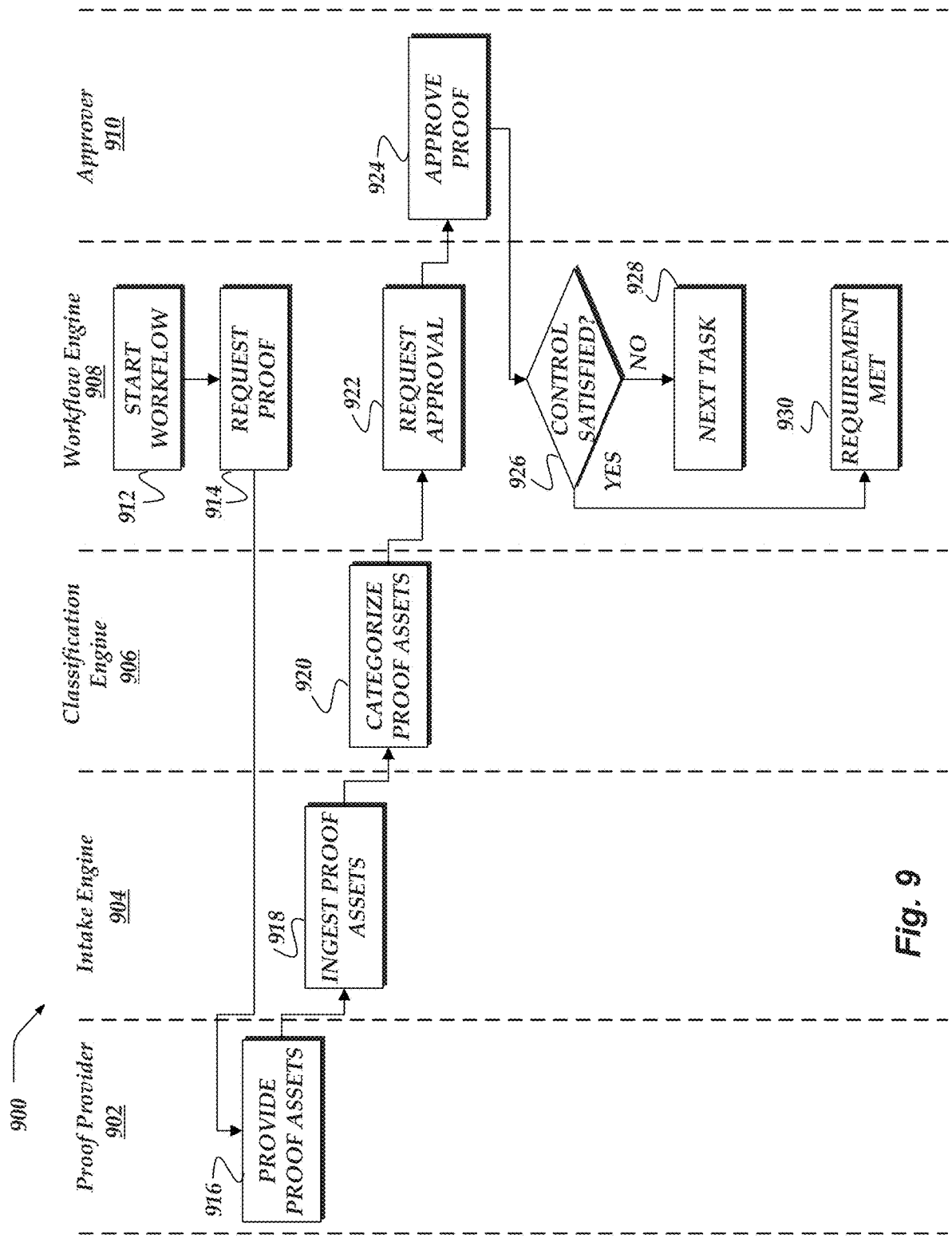
FIG. 9 illustrates a swim lane diagram of a system for managing proof assets for validating program compliance in accordance with one or more of the various embodiments.

FIG. 9 illustrates a swim lane diagram of system 900 for managing proof assets for validating program compliance in accordance with one or more of the various embodiments. System 900 is illustrated with swim lanes that illustrate how different parts of a program compliance system may be arranged to perform actions for managing program compliance.

In this example, for some embodiments, proof provider 902, intake engine 904, classification engine 909, workflow engine 910, approver 910, represent various components of system 900. Accordingly, in one or more of the various embodiments, at step 912, workflow engine 908 may begin a control object workflow.

At step 914, in one or more of the various embodiments, workflow engine 908 may be arranged to execute a workflow task that included generate a request for one or more proof assets to show compliance with a requirement. Accordingly, in some embodiments, the control object associated with the workflow may be associated with one or more proof providers, such as, proof provider 902, may be provided the request for the required proof assets.

At step 916, in one or more of the various embodiments, one or more providers, such as, proof provider 902 may locate the requested proof assets.

At step 918, in one or more of the various embodiments, an intake engine, such as, intake engine 904, may ingest the one or more proof assets provided by proof provider 902.

At step 920, in one or more of the various embodiments, a classification engine, such as, classification engine 906 may be arranged to categorize the one or more proof assets. Accordingly, in some embodiments, categorized proof assets may be tentatively added to a proof asset catalog associated with the control object based on how they are categorized.

At step 922, in this example, workflow engine 908 may be arranged to require approval before committing the proof asset to the proof asset catalog of the control object. Accordingly, in some embodiments, workflow engine 908 may be arranged to determine a user that may be enabled to approve the entry of the proof asset.

At step 924, in this example, in response to the request for approval, approver 910 may be enabled to review the proof asset and mark it approved if appropriate.

At step 926, in this example, workflow engine 908 may evaluate the proof assets that have been approved for the control object. Accordingly, at step 930, if the control object is satisfied by the proof assets associated with its proof asset catalog, workflow engine 908 may indicate that the one or more requirements associated with the control object have been met or otherwise satisfied. Alternatively, in this example, if the control object remains unsatisfied, as shown in step 930, workflow engine 908 may advance to a next task in the workflow.

Generalized Operations

FIGS. 10-17 represent generalized operations for managing proof assets for validating program compliance in accordance with one or more of the various embodiments. In one or more of the various embodiments, processes 1000, 1100, 1200, 1300, 1400, 1500, 1600, and 1700 described in conjunction with FIGS. 10-17 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 10-17 may be used for managing proof assets for validating program compliance in accordance with at least one of the various embodiments or architectures such as those described in conjunction with FIGS. 4-9. Further, in one or more of the various embodiments, some or all of the actions performed by processes 1000, 1100, 1200, 1300, 1400, 1500, 1600, and 1700 may be executed in part by intake engine 322, classification engine 324, workflow engine 326, monitoring engine 328, design engine 331, or the like, running on one or more processors of one or more network computers.

Figure 10:
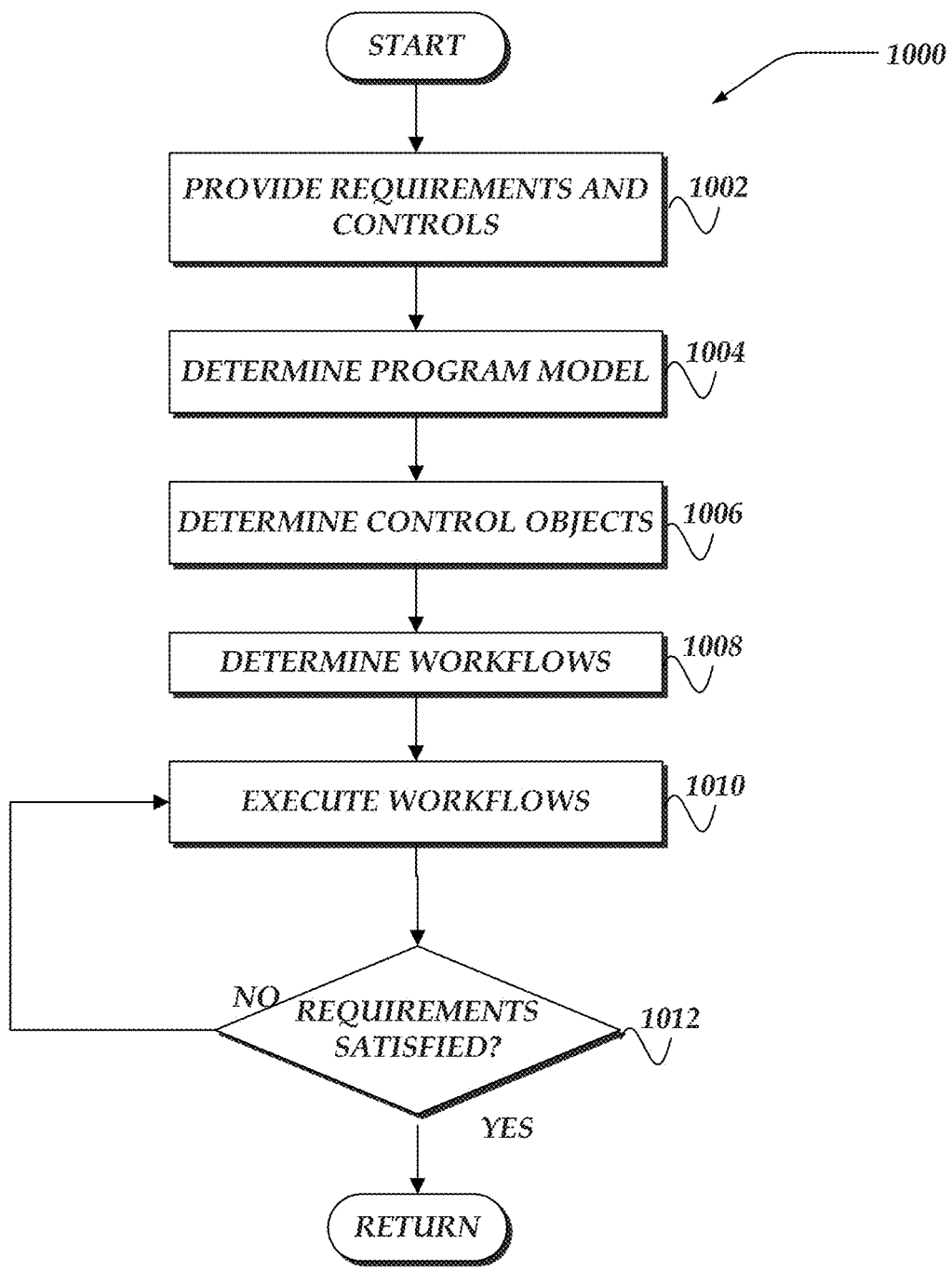
FIG. 10 illustrates an overview flowchart of a process for managing proof assets for validating program compliance in accordance with one or more of the various embodiments.

FIG. 10 illustrates an overview flowchart of process 1000 for managing proof assets for validating program compliance in accordance with one or more of the various embodiments. After a start block, at block 1002, in one or more of the various embodiments, one or more requirements associated with one or more control objects may be provided to a workflow engine.

In one or more of the various embodiments, one or more requirements may be provided as part of formal or otherwise recognized standard compliance program. Also, in some embodiments, one or more requirements may be generated based on an organization's unique needs.

In some cases, requirements provided by standards or compliance bodies may be accompanied with a prescribed set of control actions or proof assets. For example, a compliance program may define one or more requirements for training for employees that have access to sensitive information. In addition to requirements, compliance programs may provide control information that defines one or more actions or documentation that may be acceptable for proving the requirements have been met.

At block 1004, in one or more of the various embodiments, program models may be employed to implement or execute the requirement or controls for a given compliance program or set of requirements. In some embodiments, programs or requirements may be associated with well-known or otherwise distinguishable identifiers that may be associated with program models that may be designed using a design engine, such as, design engine 331.

In one or more of the various embodiments, new program models may need to be designed if a new or previously unseen compliance programs are introduced. However, in practice, in some embodiments, many organizations operating in the same business domain (e.g., finance, retail, electronic commerce, software-as-a-service, or the like) may be likely to use the some or all of the same standard compliance programs. Thus, in one or more of the various embodiments, systems for managing proof assets for validating program compliance may develop a catalog of program models for common or expected programs.

Also, in one or more of the various embodiments, programs, including custom programs may be reused (e.g., annually, bi-annually, or the like) such that custom organizational level programs models may be stored for reuse as well.

At block 1006, in one or more of the various embodiments, a compliance system may be arranged to determine one or more control objects from the program model. As described above program models may associated program requirements with control objects. Accordingly, in one or more of the various embodiments, process 1000 may locate the definitions for relevant control objects so they may be instantiated.

At block 1008, in one or more of the various embodiments, the workflow engine may be arranged to begin one or more workflows based on workflows that may be associated with one or more control objects. As described above, control objects may be associated with workflows that define various actions that may be associated with providing evidence that a control is satisfied.

In one or more of the various embodiments, program models may include a meta-workflow that organizes or otherwise manages the order of processing control objects in the program model. For example, in some embodiments, a program model may be arranged such that one or more particular control objects may be satisfied before others in the same program model.

Also, in some embodiments, for some program models, nested, grouped, or embedded control objects may be employed to introduce additional workflow control for a program model.

At block 1010, in one or more of the various embodiments, the workflow engine may be arranged to execute the one or more workflows. In one or more of the various embodiments, workflow engines may be arranged to execute workflow tasks and monitor the state of workflows. Accordingly, in some embodiments, workflow engines may be arranged to employ one or more data structures to track to state of a workflow and its associated proof assets.

At decision block 1012, in one or more of the various embodiments, if the one or more requirements for a program may be satisfied control may be returned to a calling process; otherwise, control may loop back block 1010. As described above, program models may include one or more requirements that may be associated with control objects. Accordingly, in one or more of the various embodiments, if the required control objects have been satisfied (e.g., relevant workflow tasks completed) the program model may be indicated as satisfied or otherwise completed.

Note, in one or more of the various embodiments, some program models may be designed to run continuously such that they may be associated on-going requirements. Accordingly, in one or more of the various embodiments, one or more program models may continue running rather than ending.

Next, in one or more of the various embodiments, control may be returned to a calling process.

Figure 11:
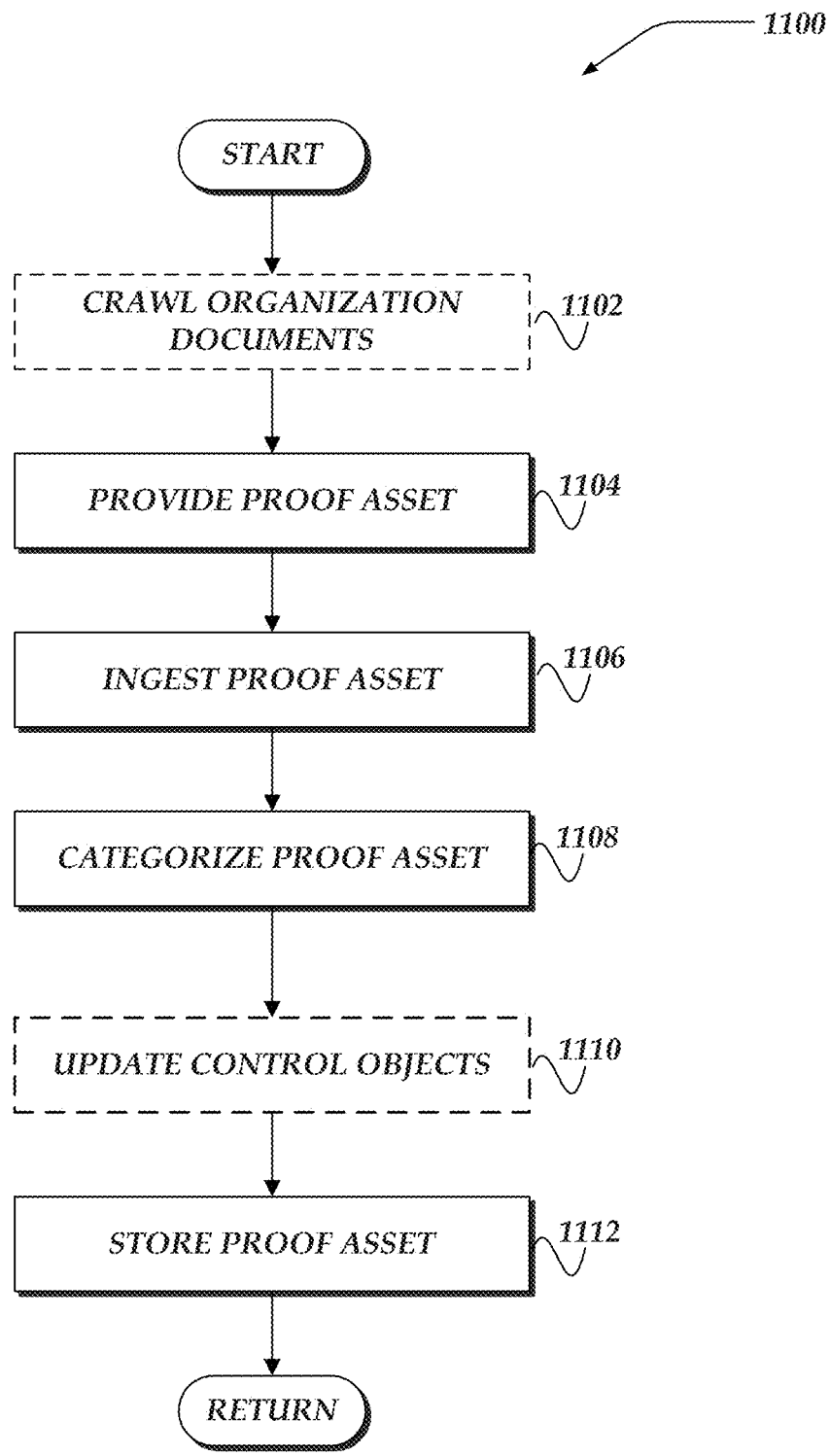
FIG. 11 illustrates a flowchart of a process for obtaining proof assets as part of managing proof assets for validating program compliance in accordance with one or more of the various embodiments.

FIG. 11 illustrates a flowchart of process 1100 for obtaining proof assets as part of managing proof assets for validating program compliance in accordance with one or more of the various embodiments. After a start block, at block 1102, in one or more of the various embodiments, optionally, an intake engine may be arranged to automatically crawl one or more document stores of an organization. In one or more of the various embodiments, document stores may include document management systems, file systems, databases, enterprise collaborative platforms (e.g., Microsoft Share Point, Slack, or the like), websites, or the like.

In one or more of the various embodiments, program models may include control objects that may execute workflow tasks to collect documents or other proof assets from different sources in an organization. In some embodiments, some program models may be arranged to continuously monitor one or more document sources and automatically collect new or updated documents.

Note, this block is indicated as being optional, because in some cases, process 1100 may be arranged to omit this step.

At block 1104, in one or more of the various embodiments, one or more proof providers may be enabled to provide one or more proof assets to the intake engine. In one or more of the various embodiments, program models may be arranged to include one or more control object that may execute workflow tasks to collect proof assets. There may one or more different collection mechanisms that may be employed as defined in a workflow or workflow task. For example, in some embodiments, users associated with proof assets may be emailed requests to upload one or more documents to a proof asset repository.

At block 1106, in one or more of the various embodiments, an intake engine may be arranged to ingest one or more proof assets.

At block 1108, in one or more of the various embodiments, a classification engine may be arranged to categorize the one or more proof assets. As proof assets are collected, a classification engine may execute one or more classification actions to classify a proof asset. In some embodiments, proof assets may be associated with categorization information provided by the users that provide the proof assets. Also, in one or more of the various embodiments, the classification engine may be arranged to generate additional categorization information by executing one or more heuristics or machine learning based classifiers.

In one or more of the various embodiments, some provided proof assets may be newer or updated versions of previously obtained or categorized proof assets. Accordingly, in some embodiments, categorization of a proof asset may include generating versioning information that may be employed to track the history of changes made to proof assets. In some embodiments, versioning information may include various information that may be useful for tracking the history of a proof assets, including, submitter information, submission time, size change information, content change information, reference/link to requests or controls that may be associated with the proof asset, or the like.

At block 1110, in one or more of the various embodiments, optionally, a workflow engine may be arranged to update one or more control objects. In some embodiments, there may be one or more pending compliance projects (e.g., active program models) that may have one or more unsatisfied requirements. Accordingly, in one or more of the various embodiments, the control objects associated with the unsatisfied requirements may be updated in view of the classified proof assets. In some embodiments, this may include advancing one or more workflows that may be associated with one or more control objects.

Note, this block is indicated as being optional, because in some cases, process 1100 may be arranged to omit this step.

At block 1112, in one or more of the various embodiments, the classification engine may be arranged to store the categorized proof assets in a proof asset data store. Accordingly, in some embodiments, the proof assets may be made available to one or more program models, control objects, or the like. Access to a given proof asset may be controlled such as organizations may restrict access to the proof asset as needed.

Next, in one or more of the various embodiments, control may be returned to a calling process.

Figure 12:
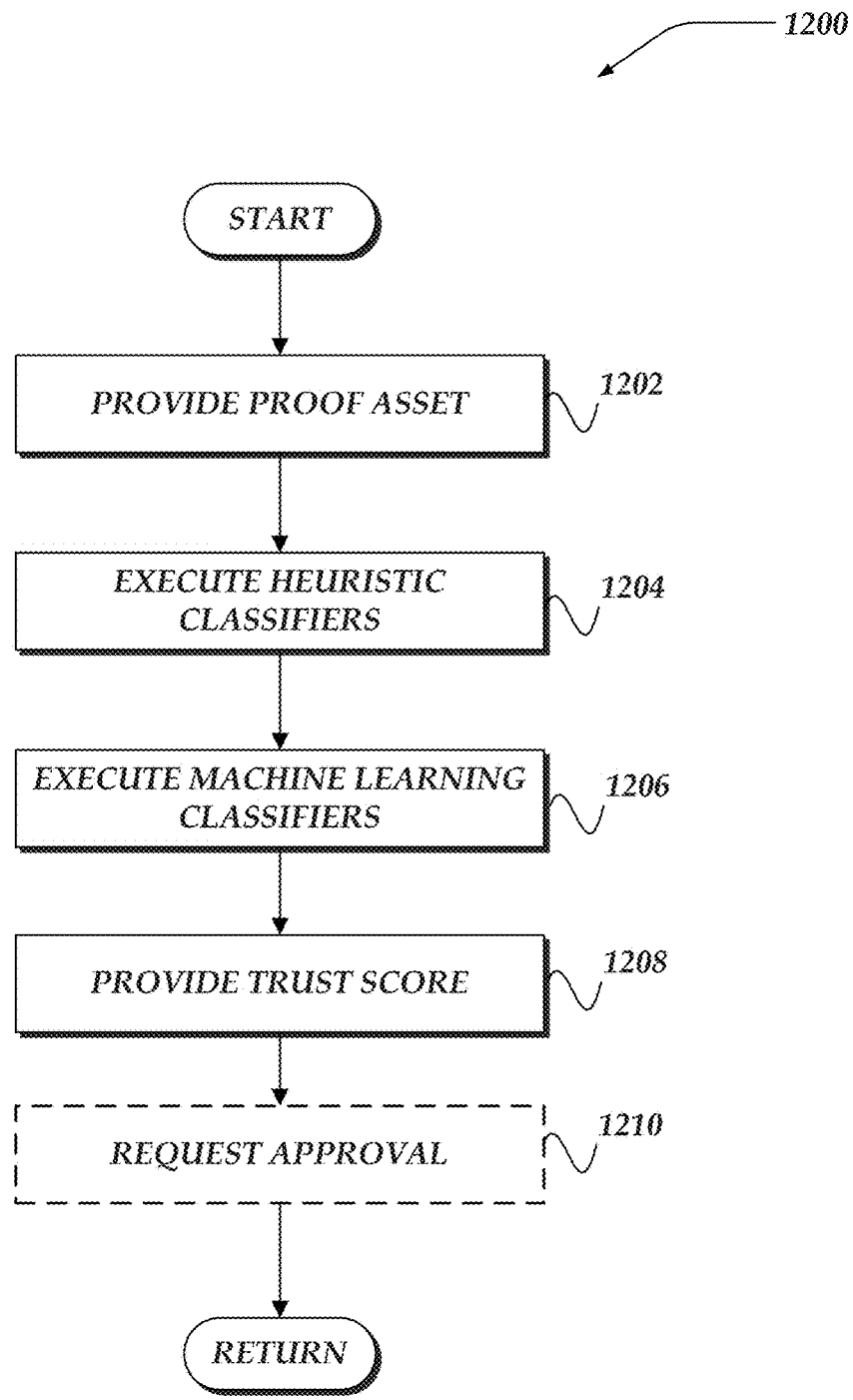
FIG. 12 illustrates a flowchart of a process for categorizing proof assets as part of managing proof assets for validating program compliance in accordance with one or more of the various embodiments.

FIG. 12 illustrates a flowchart of process 1200 for categorizing proof assets as part of managing proof assets for validating program compliance in accordance with one or more of the various embodiments. After a start block, at block 1202, in one or more of the various embodiments, one or more proof assets may be provided to a classification engine. In some embodiments, the provided proof assets may be new assets that have been added to a proof asset repository. Also, in some embodiments, the provided proof assets may be previously categorized proof assets that may be eligible for a subsequent categorization. For example, new or updated classifiers may have been introduced to the system. Likewise, for example, a new program model or control object that introduces new categories may be introduced. Accordingly, in some embodiments, the classification engine may be arranged to reclassify one or more previously received proof assets to determine if they may be relevant to the new program models or control objects.

At block 1204, in one or more of the various embodiments, the classification engine may be arranged to execute one or more heuristic classifiers to categorize the one or more proof assets. As described above, one or more rule-based or otherwise, heuristics may be employed to evaluate a proof asset to determine if it should be associated with a given category.

In one or more of the various embodiments, a given proof asset may satisfy the conditions for two or more categories. Accordingly, in one or more of the various embodiments, proof assets may be associated with one or more categories.

In one or more of the various embodiments, the particular heuristics employed to categorize proof assets may be defined based on configuration information. For example, for some embodiments, a heuristic may be arranged to automatically scan a document for one or more features, attributes, or properties.

In one or more of the various embodiments, heuristic classifiers may be arranged to perform generic categorization based on characteristics, such as, size, age, ownership, document format/type, or the like. In some generic categorizations may be employed by other more specific heuristic classifiers or machine learning classifiers. For example, in some embodiments, a generic category, such as, document age may be employed to exclude one or more documents from other categories.

Also, in some embodiments, classification engines may be arranged to employ one or more other services or other external services to categorize one or more proof assets. Accordingly, in some embodiments, classification engines may be arranged to communicate one or more proof assets or portions of proof assets to contracted third party services to contribute to the categorization of proof assets.

At block 1206, in one or more of the various embodiments, the classification engine may be arranged to execute one or more machine learning classifiers to classify the one or more proof assets. In additional to heuristic classifiers, classification engines may be arranged to execute one or more machine learning based classifiers that have been trained to identify various proof assets or proof asset features.

Similar to heuristic classifiers, one or more machine learning classifiers may be arranged to perform generic categorization.

Also, similar to heuristic classifiers one or more machine learning classifiers may be provided by other services, including contracted third-party services. Accordingly, in some embodiments, classification engines may be arranged to communicate one or more proof assets or proof asset portions to other services that may contribute to the categorization of proof assets.

At block 1208, in one or more of the various embodiments, the classification engine may be arranged to generate a score that represents a measure of confidence in the accuracy of the classification of the proof assets. In one or more of the various embodiments, one or more of the classifiers employed to categorize the proof assets may provide a confidence score that reflects the strength of a match for a given classifier. Accordingly, in one or more of the various embodiments, one or more scores may be associated with each category associated with a proof asset.

In one or more of the various embodiments, the confidence score may be comprised of a combination sub-scores produced by one or more different classifiers. In some embodiments, confidence scores may be in program models, control objects, workflows, or the like. In some embodiments, proof assets may be included or excluded based on confidence scores. Also, in some embodiments, confidence scores may trigger additional approval tasks or automatic requests for additional or alternative proof assets. Generally, in some embodiments, confidence scores may be criteria that may be used for arbitrary purposes depending on the definition of program models, control objects, workflows, or the like.

At block 1210, in one or more of the various embodiments, optionally, a workflow engine may be arranged to generate one or more requests for approval that may be associated with one or more categorized proof assets. In some embodiments, requests may be directed to one or more users or services that may be enabled to confirm or otherwise approve one or more classification results. In one or more of the various embodiments, the request for approval may request approval to assign the one or more categorized proof assets to one or more proof asset catalogs associated with one or more control objects.

Note, this block is indicated as being optional, because in some cases, process 1200 may be arranged to omit this step.

Next, in one or more of the various embodiments, control may be returned to a calling process.

Figure 13:
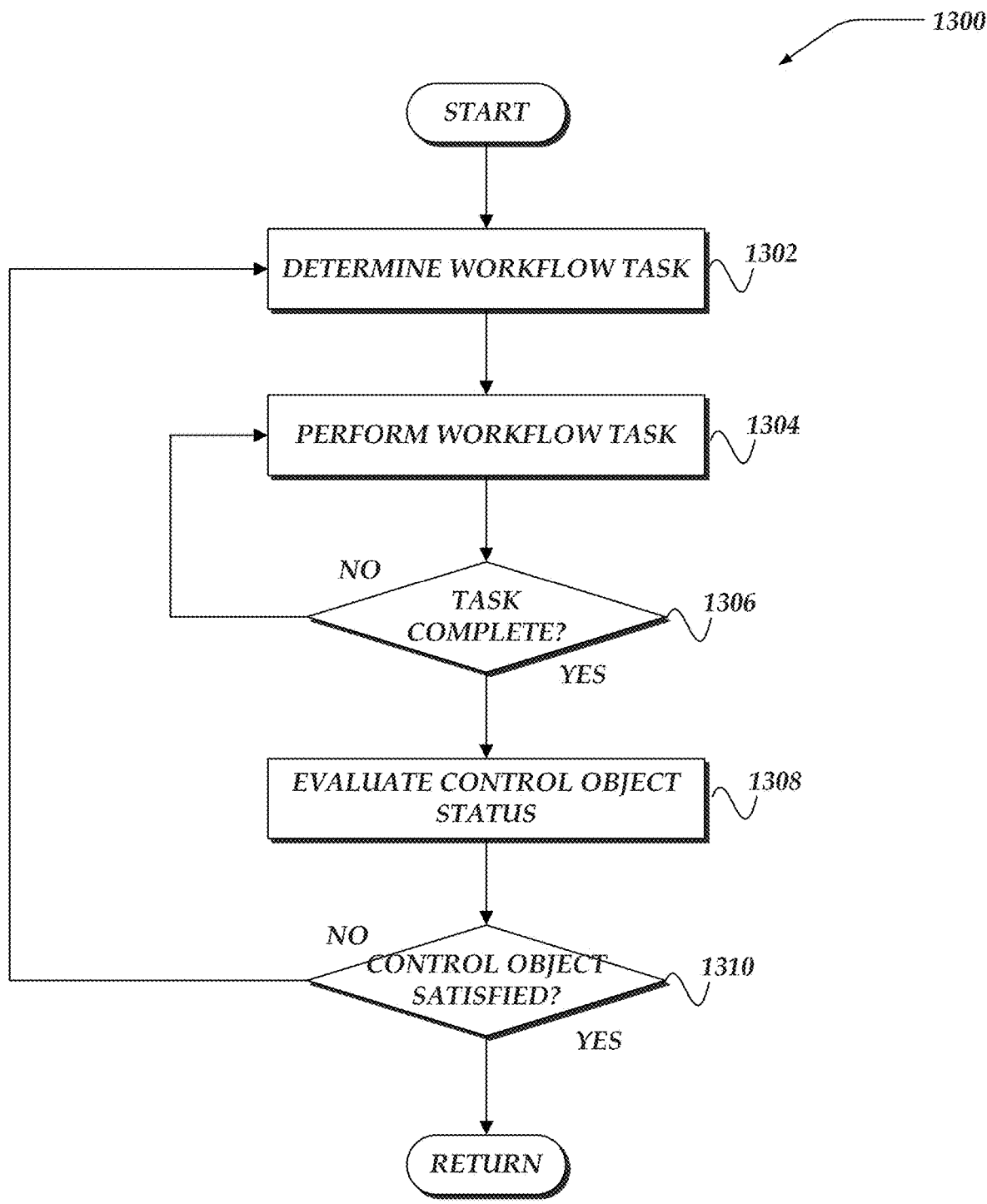
FIG. 13 illustrates a flowchart of a process for executing workflows for managing proof assets for validating program compliance in accordance with one or more of the various embodiments.

FIG. 13 illustrates a flowchart of process 1300 for executing workflows for managing proof assets for validating program compliance in accordance with one or more of the various embodiments. After a start block, at block 1302, in one or more of the various embodiments, a workflow engine may be arranged to determine a workflow task that may be part of a control object workflow. As described above control objects may be associated with one or more workflows that include one or more workflow tasks. Also, in some embodiments, workflows may be associated with a program model than being associated with a particular control object.

Also, in one or more of the various embodiments, workflow engines may be arranged to simultaneously or concurrent run workflows or workflow tasks from more than one program model, control object, workflow, or the like.

At block 1304, in one or more of the various embodiments, the workflow engine may be arranged to execute the workflow task. As described above, workflow tasks may include various actions that should be performed by one or more services, organizations, users, or the like.

At decision block 1306, in one or more of the various embodiments, if the workflow task is complete, control may flow to block 1308; otherwise, control may loop back to block 1304. As described above, in some embodiments, workflow tasks may be associated with various conditions or criteria that may be evaluated to determine if a particular workflow task may completed.

At block 1308, in one or more of the various embodiments, the workflow engine may be arranged to evaluate the status of the control object. As described above, workflow engines may be arranged to monitor or otherwise determine the status of control objects and program models in general. Accordingly, in one or more of the various embodiments, as workflow tasks for a control object are completed, the workflow engine may evaluate if the control objects associated with the completed task may be satisfied.

In some embodiments, one workflow task may contribute to the state of more than one control object. Or, in some embodiments, the same workflow task may be included in more than one workflow. Accordingly, in some embodiments, the completion of a workflow task may enable more than one control object to be satisfied or completed.

At decision block 1310, in one or more of the various embodiments, if the control object is satisfied, control may be returned to a calling process; otherwise, control may loop back to block 1302. In some embodiments, one or more control objects may be arranged to rely on more than workflow or workflow task. Accordingly, if the may be unfinished workflow tasks for a given control object, those workflow tasks may be executed.

Next, in one or more of the various embodiments, control may be returned to a calling process.

Figure 14:
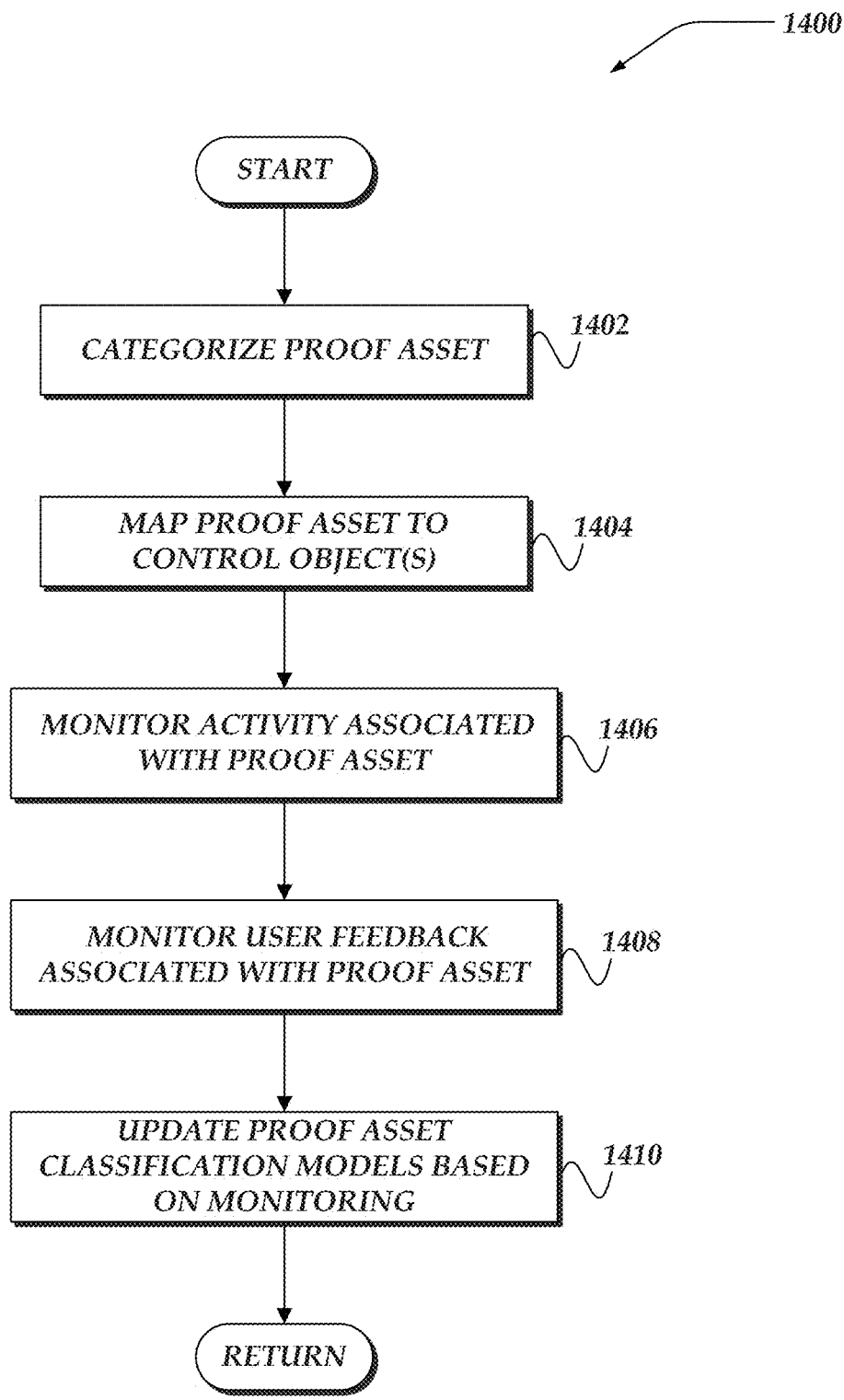
FIG. 14 illustrates a flowchart of a process for monitoring activity for updating proof asset classification models for managing proof assets for validating program compliance in accordance with one or more of the various embodiments.

FIG. 14 illustrates a flowchart of process 1400 for monitoring activity for updating proof asset classification models for managing proof assets for validating program compliance in accordance with one or more of the various embodiments. After a start block, at block 1402, in one or more of the various embodiments, a classification engine may be arranged to categorize one or more proof assets. As described, classification engines may be arranged to execute one or more classifiers to automatically categorize proof assets.

At block 1404, in one or more of the various embodiments, the classification engine may be arranged to associate the one or more proof assets to one or more control objects. In some embodiments, proof assets have been categorized they may be mapped to one or more proof asset catalogs that may be associated with control objects.

In one or more of the various embodiments, the mapping actions may be automatic or workflow driven depending on the control object or proof asset. In some embodiments, mapped proof assets may include proof assets that may be waiting for approval as well as proof assets that may be considered approved or confirmed for one or more control objects.

At block 1406, in one or more of the various embodiments, a monitoring engine may be arranged to monitor user activities or interactions that may be associated with the one or more proof assets. Accordingly, in one or more of the various embodiments, monitoring engines may monitor one or more metrics that may be analyzed to indicate if users may be satisfied with the mapping and categorization of proof assets.

In one or more of the various embodiments, monitoring engines may be arranged to track metrics for program models, control objects, workflows, classifiers, approvers, providers, or the like. Accordingly, in some embodiments, monitoring engines may collect information related to how often the classification engine incorrectly classifies proof assets. For example, in some embodiments, monitoring engines may be track how often proof asset categorized by a given classifier are rejected by approvers.

Similarly, in some embodiments, monitoring engines may be arranged to track which users may be providing proof assets that may be difficult to categorize. Also, in some embodiments, monitoring engines may be arranged to track which users or user roles may provide proof assets that may not match the requested categories of proof assets more often than other users or user roles. For example, automated requests for certain proof assets may be confusing or using descriptive terms that may have different meanings for different parts of an organization.

At block 1408, in one or more of the various embodiments, the monitoring engine may be arranged to monitor user feedback associated with proof assets. In addition to passive monitoring, monitoring engines may be enable to collect express feedback provided by users. Accordingly, in some embodiments, compliance systems may be arranged to provide users a user-interface that enables then to grade the quality of proof asset categorization for various categories of proof assets.

At block 1410, in one or more of the various embodiments, the classification engine may be arranged to update one or more proof asset classification models based on information gathered from monitoring activity or feedback that may be associated with the proof assets. For example, a machine learning classifier that has received negative feedback or may be associated with otherwise incorrectly categorized proof assets, may require re-training, or the like.

In one or more of the various embodiments, monitoring engines may be arranged to provide reports or notifications regarding the quality of classifiers. For example, an administrator may be provide a list of classifiers that may be suspected of being poor performers.

Next, in one or more of the various embodiments, control may be returned to a calling process.

Figure 15:
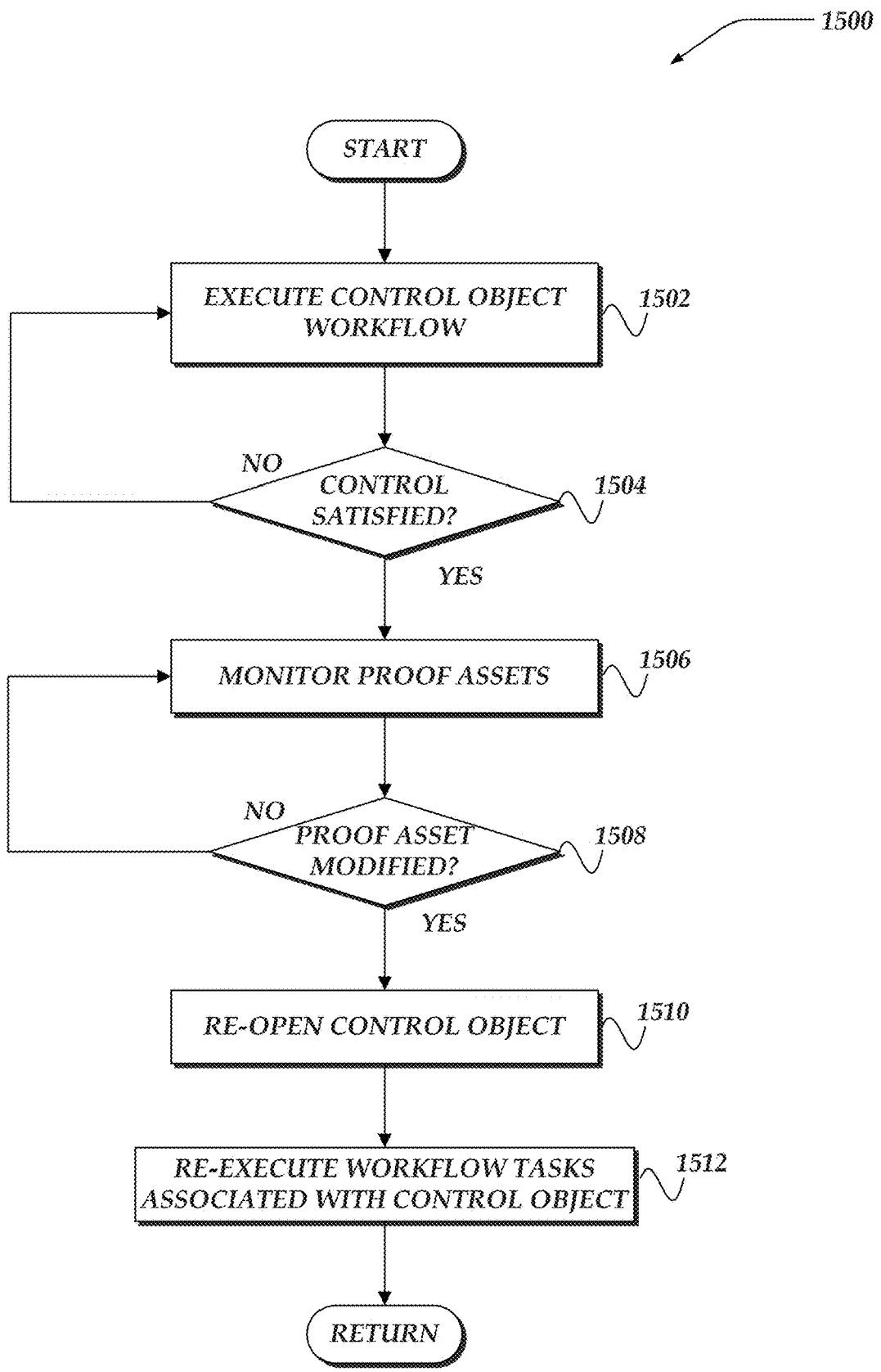
FIG. 15 illustrates a flowchart of a process for monitoring proof assets that have been associated with control objects for managing proof assets for validating program compliance in accordance with one or more of the various embodiments.

FIG. 15 illustrates a flowchart of process 1500 for monitoring proof assets that have been associated with control objects for managing proof assets for validating program compliance in accordance with one or more of the various embodiments. After a start block, at block 1502, in one or more of the various embodiments, a workflow engine may execute one or more workflows that may be associated with a control object.

At decision block 1504, in one or more of the various embodiments, if the control object is satisfied, control may flow to block 1506; otherwise, control may loop back to block 1502. As described above, as workflows for control objects are satisfied, those control objects may be indicated as satisfied.

At block 1506, in one or more of the various embodiments, a monitoring engine may be arranged to monitor one or more proof assets that may be associated with the satisfied control object. As described above, proof assets provided for a control object may be stored in a proof asset repository. Likewise, in some embodiments, proof asset catalogs may be associated with control objects. In some embodiments, proof asset catalogs may be arranged to store meta-data about proof assets that are entered into the catalog to satisfy a control object. For example, in some embodiments, an entry for a proof asset in control object proof assets catalog may include information, such as, timestamps, document size, location, checksum information, cryptographic signing information, version/change information, or the like.

Accordingly, in one or more of the various embodiments, information in the proof asset catalog entry for a proof asset may be employed to confirm that the proof asset remains unchanged since it was approved and accepted.

At decision block 1508, in one or more of the various embodiments, if a proof asset that may be associated with the control objects have been modified, control may flow to block 1510; otherwise, control may loop back to block 1506.

At block 1510, in one or more of the various embodiments, the workflow engine may be arranged to reopen the control object. In one or more of the various embodiments, if a proof asset is changed, it may impact more than one control object. Thus, in some embodiments, each affected control object may be changed from a completed or satisfied status to incomplete or unsatisfied.

At block 1512, in one or more of the various embodiments, the workflow engine may be arranged to re-execute one or more workflow tasks that may be associated with the control object. In some embodiments, program models, control objects, workflows, or the like, may be configured to automatically restart one or more workflow or workflow tasks that may be associated with the modified proof assets.

In one or more of the various embodiments, program models, control objects, workflows, workflow tasks, or the like, may be configured to raise alerts, notifications, or alarms rather than automatically restart the associated workflows, or the like. For example, in some embodiments, a program model may be designated as completed and compliance report may have been generated and provided to a governing body. Accordingly, in this example, a proof asset modification that may be disqualify the program model and put the organization's compliance in jeopardy may require additional investigation before restarting the impacted workflows.

In contrast, for example, if a program model has some control objects completed and other control objects in process (not completed), it may be expected or otherwise unsurprising that proof assets associated with one or more of the completed control objects may change. For example, if a proof asset that provides a better match for a control object may be discovered, it may be substituted into the control object proof asset catalog triggering another approval cycle. Likewise, in some cases, control objects may generate requests such as "if you have a document X please provide it to the compliance system" after a threshold number of documents are provided the control object may be deemed completed, but a late arriving proof asset may automatically trigger reopening the control object and activating an approval workflow that may be associated with the control object.

In one or more of the various embodiments, program models or control objects may be arranged to include workflows designed to handle proof asset modifications. Otherwise, in some embodiments, monitoring engines may be enabled to employ configuration information to determine the specific actions to perform if accepted/approved proof assets may be modified.

Next, in one or more of the various embodiments, control may be returned to a calling process.

Figure 16:
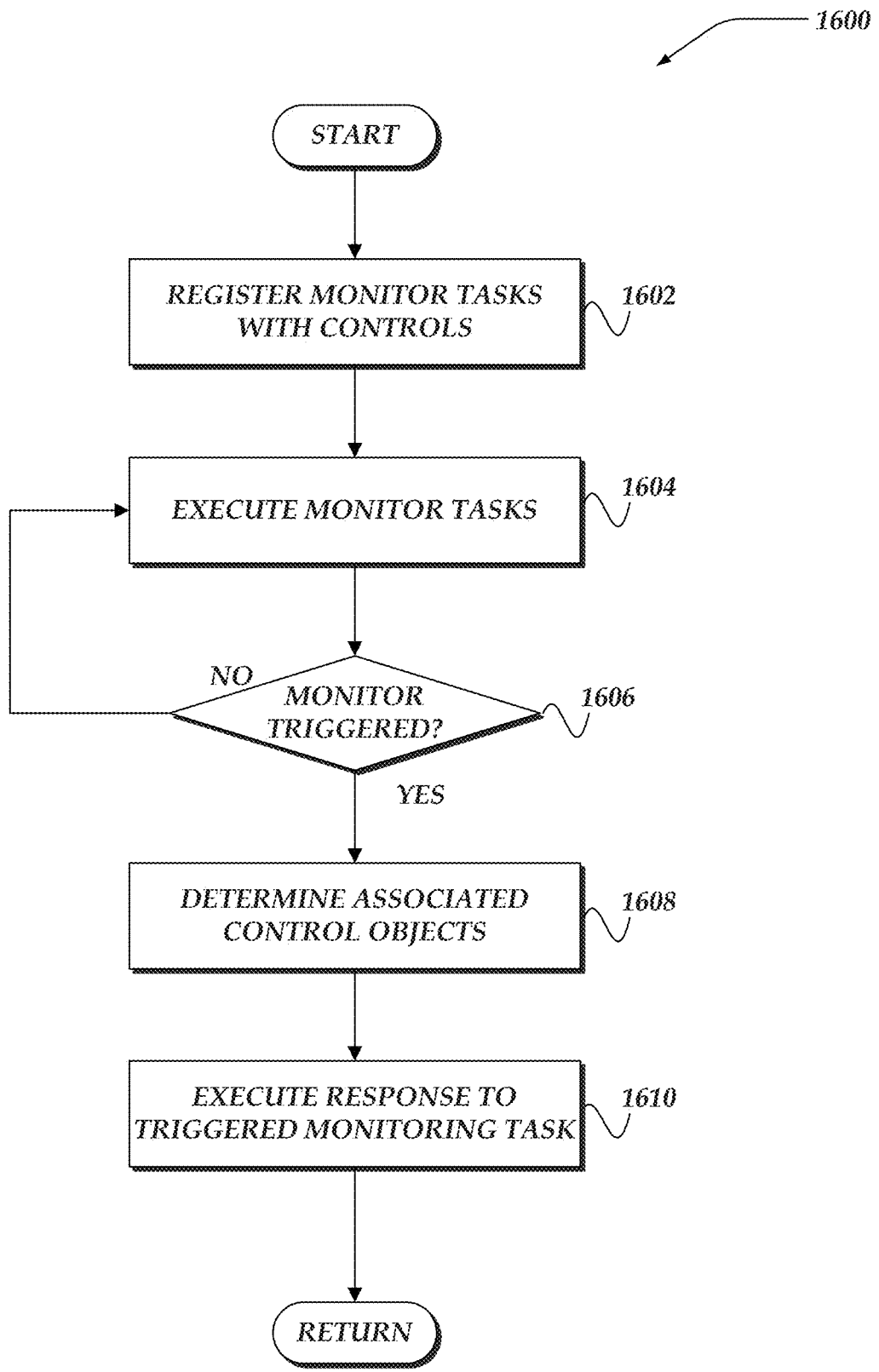
FIG. 16 illustrates a flowchart of a process for monitoring activities in an organization for managing proof assets for validating program compliance in accordance with one or more of the various embodiments.

FIG. 16 illustrates a flowchart of process 1600 for monitoring activities in an organization for managing proof assets for validating program compliance in accordance with one or more of the various embodiments. After a start block, at block 1602, in one or more of the various embodiments, a monitoring engine may be arranged to register one or more monitor tasks with one or more control object. In one or more of the various embodiments, the range of monitoring tasks associated with different program models may be difficult to predict. In some cases, monitoring proof asset changes, control objects changes, program model changes, or the like, may be well-defined. However, in some embodiments, other monitoring functions that may be associated with program models, control objects, or the like, may be highly dependent on the requirements of particular program model.

For example, in some embodiments, a program model may include one or more control objects for one or more requirements associated with new employees being hired. Accordingly, in one or more of the various embodiments, a monitoring task that is arranged to monitor new entries in an employee database may be register with the monitoring engine. Accordingly, in some embodiments, in this example, the monitoring engine may be arranged to detect if new employees are added to the employee database.

Other examples of registered monitoring tasks may include, interfaces with revenue systems, inventory systems, information technology asset management systems, or the like. For example, in some embodiments, an organization may employ an on-going/continuous program model to establish compliance programs related to devices being issued to employees. Accordingly, in this example, a monitoring task may be triggered if new devices are added to device database may be registered.

In some embodiments, the configuration of a given monitor task may vary depending on the interface to the monitored system. However, in some embodiments, monitoring engines may be arranged to provide one or more interfaces or APIs that registered monitoring tasks may employ to communicate with monitoring engines.

In some embodiments, some monitoring tasks may be performed by monitoring engines directly, such as, monitoring changes to particular file systems, monitoring web sites, monitoring log files, or the like.

Accordingly, in one or more of the various embodiments, registered monitoring tasks may be associated with one or more program models or control objects. In some embodiments, this may include associating object IDs, callbacks, or the like, of the relevant program models or control objects with the registered monitoring task.

At block 1604, in one or more of the various embodiments, the monitoring engine may be arranged to execute the one or more monitoring tasks. In one or more of the various embodiments, registered monitoring tasks performed by monitoring engines may be executed by the monitoring engines. In some embodiments, this may include polling remote services or APIs. Further, in some embodiments, executing registered monitoring tasks may include actively or passively monitoring event handlers, API entry points, message queues, or the like, that may be used by registered monitoring tasks including those monitoring tasks that may be associated with other services.

At decision block 1606, in one or more of the various embodiments, if a monitor may be triggered, control may flow to block 1608; otherwise, control may loop back to block 1604.

At block 1608, in one or more of the various embodiments, the monitoring engine may be arranged to determine one or more program models or one or more control objects that may be associated with the triggered registered monitoring task.

At block 1610, in one or more of the various embodiments, the monitoring engine may be arranged to execute one or more responses to the triggering to of the registered monitoring task. For example, this may include changing the status of a particular control object from complete to incomplete. Thus, in this example, the associated workflows for may be started to bring the control object back to a completed state.

Next, in one or more of the various embodiments, control may be returned to a calling process.

Figure 17:
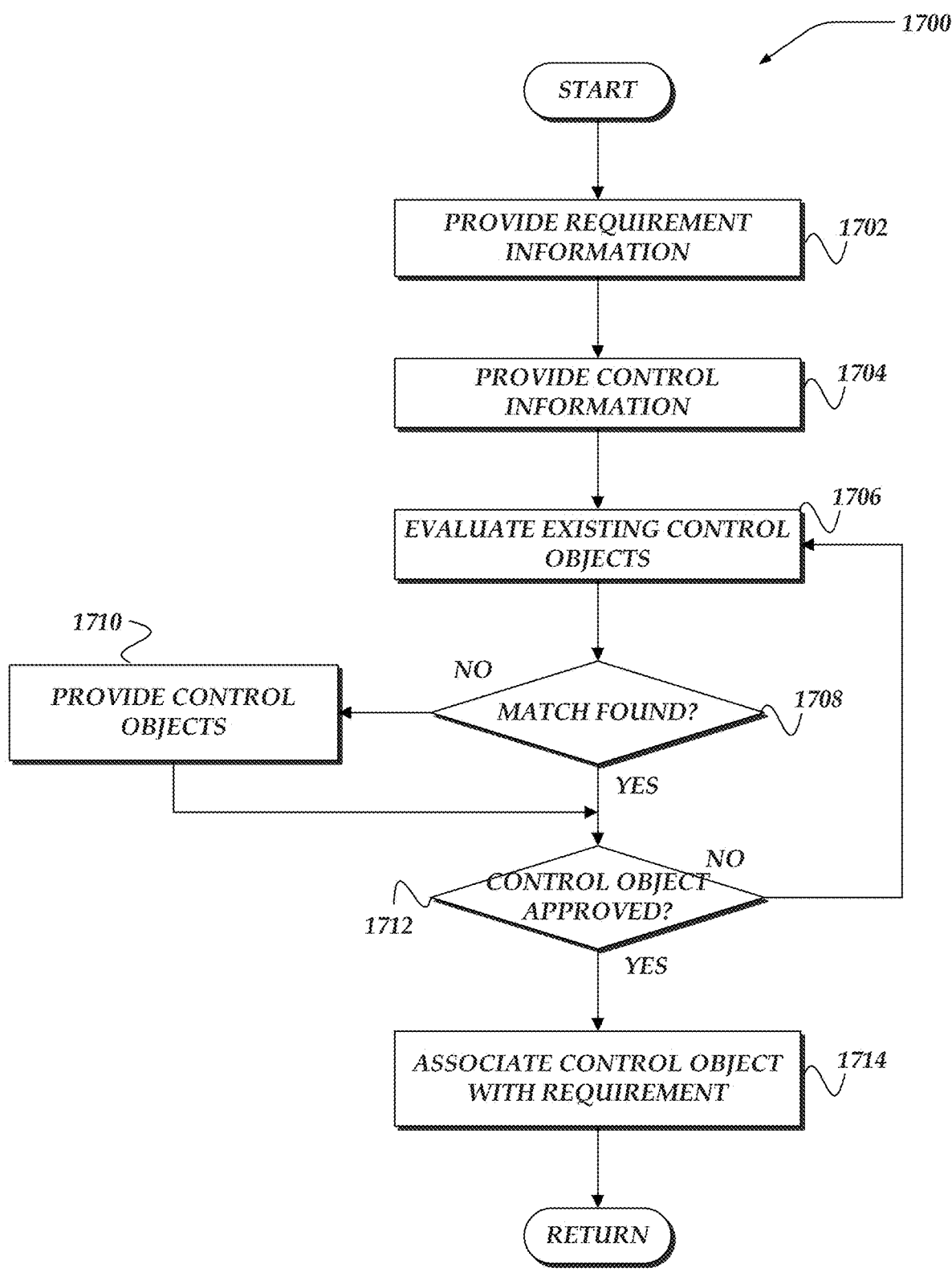
FIG. 17 illustrates a flowchart of a process for automatically associating control objects with requirements in accordance with one or more of the various embodiments.

FIG. 17 illustrates a flowchart of process 1700 for automatically associating control objects with requirements in accordance with one or more of the various embodiments. After a start block, at block 1702, in one or more of the various embodiments, a design engine may be provided requirement information that may include serial numbers, text descriptions, keywords, tags, or the like, that may be interpreted by the design engine. For example, in some cases, requirement information associated with standard compliance programs may use well-known or distinct identifiers, codes, labels, descriptions, or the like.

At block 1704, in one or more of the various embodiments, the design engine may be provided control information that may be associated with the provided requirement information. Similar to requirements, in some cases, control information may include serial numbers, text descriptions, keywords, tags, or the like, that may be interpreted by the design engine. For example, in some cases, control information associated with standard compliance programs may use well-known or distinct identifiers, codes, labels, descriptions, or the like.

At block 1706, in one or more of the various embodiments, the design engine may be arranged to evaluate its repository of control objects to determine if existing control objects may be suitable for the requirement that was provided. In some embodiments, if the requirement information includes distinct identifier, the design engine may be arranged to lookup one or more control objects that may be associated with the same identifier.

In other cases, for some embodiments, the design engine may be arranged to employ fuzzy matching, machine learning classifiers, or the like, to determine if suitable control objects are available. For example, keywords, descriptions, labels, or the like, that are included in the requirement information or the control information may be employed to determine one or more suitable control objects.

In some embodiments, one or more control objects may be included in a community collection such that they may be usable by more than one organization. For example, control objects included in a control object gallery or otherwise made available to other unrelated organizations may be included in the evaluation of control objects.

At decision block 1708, in one or more of the various embodiments, if one or more suitable control objects are determined, control may flow to block 1710; otherwise, control may flow decision block 1712. In one or more of the various embodiments, the criteria used to determine a match may vary depending organization preferences. Accordingly, in some embodiments, design engines may be arranged to employ configuration information to determine specific match criteria.

At block 1710, in some embodiments, the design engine may be arranged to generate one or more control objects based on the control information. In some embodiments, the design engine may generate partially configured control objects based on the control information. For example, in some embodiments, the design engine may be enabled to determine one or more proof assets for the control object from parsing the control information because it may include a list of documents that may be considered suitable for proving that the requirement is met.

Further, in some embodiments, if the generated control object has attributes or features that overlap with other known or existing control objects used by organization, the design engine may be arranged to populate one or more fields in the control objects based on those previously used control objects. For example, in some embodiments, if the control object is similar to control object A, the design engine may be arranged to assign the same owners to the new control object.

At decision block 1712, in some embodiments, if the control objects are approved, control may flow to block 1714; otherwise, control may loop back to 1706. In some embodiments, the design engine may be arranged to provide a report of the generated or matching control objects to one or more users for approval. In some embodiments, providing the control objects may include generating an interactive user-interface that may be presented to one or more users associated with the organization. Accordingly, in one or more of the various embodiments, one or more users may be enabled to interactively approve, reject, or modify one or more of the control objects presented in the report. For example, in some embodiments, organizations may be enabled to perform actions that may include: modifying ownership of the control, assigning tasks to collect evidence, initiating discussions about controls; or the like.

At block 1714, in one or more of the various embodiments, the design engine may be arranged to associate the approve control object with the requirement. Accordingly, in some embodiments, by continuing this process a user may design or generate a program model.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data using one or more network computers, comprising:
    providing a program model that includes a plurality of requirements for complying with a compliance program and a plurality of control objects, wherein each control object is associated with one or more of the plurality of requirements, one or more tasks, and one or more proof assets;
    providing a machine learning engine to execute the one or more tasks to perform further actions, including:
        generating one or more requests to classify each proof asset that is associated with the plurality of control objects;
        validating each classified proof asset based on one or more of scores associated with a strength of its classification and the plurality of control objects that are associated with the each classified proof asset;
        determining one or more completed control objects based on the one or more validated proof assets;
        employing geolocation information provided by a global positioning system (GPS) device to select one or more of a time zone, language, currency, or calendar formatting for use in localizing one or more of documents, asset classification, user interfaces, reports, internal processes, or databases;
        employing an amount of the completed control objects that is equivalent to a total amount of the plurality of the control objects to provide a report indicating that the plurality of requirements associated with the program model are satisfied, wherein the report is localized for a user based on the geolocation information; and
        employing detection of one or more modifications to the one or more validated proof assets to perform further actions, including:
            redetermining each of the one or more completed control objects that are affected by the one or more modifications to be an uncompleted control object; and
            re-executing each task associated with each uncompleted control object, wherein the re-executing includes restarting one or more tasks associated with those modified proof assets that are associated with one or more uncompleted control objects.

2. The method claim 1, wherein detection of the one or more modifications to the one or more validated proof assets, further comprises determining a portion of the plurality of control objects that are associated with one or more modified proof assets based on an asset catalog that is associated with each of the plurality of control objects.

3. The method of claim 1, further comprising:
    collecting one or more documents based on the one or more generated requests, wherein the one or more documents correspond to one or more requests to collect proof assets;
    employing one or more classifiers to categorize the one or more documents based on one or more characteristics of the one or more documents; and
    associating the one or more documents with one or more control objects based on the categorization.

4. The method of claim 1, wherein validating each classified proof asset,
further comprises:
providing one or more classified proof assets to one or more of one or more services or one or more users; and
validating the one or more classified proof assets based on an approval response from the one or more of one or more services or the one or more users.

5. The method of claim 1, further comprising:
automatically determining one or more control objects based on one or more characteristics of the plurality of requirements; and
including the one or more determined control objects in the plurality of control objects.

6. The method of claim 1, further comprising:
storing the one or more validated proof assets in a data store; and
automatically associating the one or more stored proof assets with one or more other control objects that are associated with another program model based on a match of the one or more stored proof assets and the one or more proof assets associated with the one or more other control objects.

7. The method of claim 1, further comprising:
executing one or more monitor tasks that are registered to monitor one or more of one or more conditions or one or more metrics; and
in response to a triggering of a monitor task, performing further actions, including:
determining one or more control objects that are associated with the triggered monitor task; and
executing one or more workflow tasks based on the one or more control objects.

8. The method of claim 1, further comprising, determining the program model based on a standards based compliance program, wherein the compliance program defines the plurality of requirements.

9. A system for managing data using one or more network computers, comprising:
a network computer, comprising:
a transceiver that communicates over the network;
a memory that stores at least instructions; and
one or more processors that execute instructions that perform actions, including:
providing a program model that includes a plurality of requirements for complying with a compliance program and a plurality of control objects, wherein each control object is associated with one or more of the plurality of requirements, one or more tasks, and one or more proof assets;
providing a machine learning engine to execute the one or more tasks to perform further actions, including:
generating one or more requests to classify each proof asset that is associated with the plurality of control objects;
validating each classified proof asset based on one or more of scores associated with a strength of its classification and the plurality of control objects that are associated with the each classified proof asset;
determining one or more completed control objects based on the one or more validated proof assets;
employing geolocation information provided by a global positioning system (GPS) device to select one or more of a time zone, language, currency, or calendar formatting for use in localizing one or more of documents, asset classification, user interfaces, reports, internal processes, or databases;
employing an amount of the completed control objects that is equivalent to a total amount of the plurality of the control objects to provide a report indicating that the plurality of requirements associated with the program model are satisfied, wherein the report is localized for a user based on the geolocation information; and
employing detection of one or more modifications to the one or more validated proof assets to perform further actions, including:
redetermining each of the one or more completed control objects that are affected by the one or more modifications to be an uncompleted control object; and
re-executing each task associated with each uncompleted control object, wherein the re-executing includes restarting one or more tasks associated with those modified proof assets that are associated with one or more uncompleted control objects; and
a client computer, comprising:
another transceiver that communicates over the network;
another memory that stores at least instructions; and
one or more processors that execute instructions that perform actions, including:
providing one or more of the collected proof assets.

10. The system of claim 9, wherein detection of the one or more modifications to the one or more validated proof assets, further comprises determining a portion of the plurality of control objects that are associated with one or more modified proof assets based on an asset catalog that is associated with each of the plurality of control objects.

11. The system of claim 9, wherein the one or more processors of the network computer execute instructions that perform further actions comprising:
collecting one or more documents based on the one or more generated requests, wherein the one or more documents correspond to one or more requests to collect proof assets;
employing one or more classifiers to categorize the one or more documents based on one or more characteristics of the one or more documents; and
associating the one or more documents with one or more control objects based on the categorization.

12. The system of claim 9, wherein validating each classified proof asset, further comprises:
providing one or more classified proof assets to one or more of one or more services or one or more users; and
validating the one or more classified proof assets based on an approval response from the one or more of one or more services or the one or more users.

13. The system of claim 9, wherein the one or more processors of the network computer execute instructions that perform further actions comprising:
automatically determining one or more control objects based on one or more characteristics of the plurality of requirements; and
including the one or more determined control objects in the plurality of control objects.

39

14. The system of claim 9, wherein the one or more processors of the network computer execute instructions that perform further actions comprising:
   storing the one or more validated proof assets in a data store; and
   automatically associating the one or more stored proof assets with one or more other control objects that are associated with another program model based on a match of the one or more stored proof assets and the one or more proof assets associated with the one or more other control objects.

15. The system of claim 9, wherein the one or more processors of the network computer execute instructions that perform further actions comprising:
   executing one or more monitor tasks that are registered to monitor one or more of one or more conditions or one or more metrics; and
   in response to a triggering of a monitor task, performing further actions, including:
      determining one or more control objects that are associated with the triggered monitor task; and
      executing one or more workflow tasks based on the one or more control objects.

16. The system of claim 9, wherein the one or more processors of the network computer execute instructions that perform further actions comprising, determining the program model based on a standards based compliance program, wherein the compliance program defines the plurality of requirements.

17. A processor readable non-transitory storage media that includes instructions for managing data, wherein execution of the instructions by one or more processors performs actions, comprising:
   providing a program model that includes a plurality of requirements for complying with a compliance program and a plurality of control objects, wherein each control object is associated with one or more of the plurality of requirements, one or more tasks, and one or more proof assets;
   providing a machine learning engine to execute the one or more tasks to perform further actions, including:
      generating one or more requests to classify each proof asset that is associated with the plurality of control objects;
      validating each classified proof asset based on one or more of scores associated with a strength of its classification and the plurality of control objects that are associated with the each classified proof asset;
      determining one or more completed control objects based on the one or more validated proof assets;
      employing geolocation information provided by a global positioning system (GPS) device to select one or more of a time zone, language, currency, or calendar formatting for use in localizing one or more of documents, asset classification, user interfaces, reports, internal processes, or databases;
      employing an amount of the completed control objects that is equivalent to a total amount of the plurality of the control objects to provide a report indicating that the plurality of requirements associated with the program model are satisfied, wherein the report is localized for a user based on the geolocation information; and
      employing detection of one or more modifications to the one or more validated proof assets to perform further actions, including:

40 redetermining each of the one or more completed control objects that are affected by the one or more modifications to be an uncompleted control object; and
      re-executing each task associated with each uncompleted control object, wherein the re-executing includes restarting one or more tasks associated with those modified proof assets that are associated with one or more uncompleted control objects.

18. The media of claim 17, wherein detection of the one or more modifications to the one or more validated proof assets, further comprises determining a portion of the plurality of control objects that are associated with one or more modified proof assets based on an asset catalog that is associated with each of the plurality of control objects.

19. The media of claim 17, further comprising:
   collecting one or more documents based on the one or more generated requests, wherein the one or more documents correspond to one or more requests to collect proof assets;
   employing one or more classifiers to categorize the one or more documents based on one or more characteristics of the one or more documents; and
   associating the one or more documents with one or more control objects based on the categorization.

20. The media of claim 17, wherein validating each classified proof asset, further comprises:
   providing one or more classified proof assets to one or more of one or more services or one or more users; and
   validating the one or more classified proof assets based on an approval response from the one or more of one or more services or the one or more users.

21. The media of claim 17, further comprising:
   automatically determining one or more control objects based on one or more characteristics of the plurality of requirements; and
   including the one or more determined control objects in the plurality of control objects.

22. The media of claim 17, further comprising:
   storing the one or more validated proof assets in a data store; and
   automatically associating the one or more stored proof assets with one or more other control objects that are associated with another program model based on a match of the one or more stored proof assets and the one or more proof assets associated with the one or more other control objects.

23. The media of claim 17, further comprising:
   executing one or more monitor tasks that are registered to monitor one or more of one or more conditions or one or more metrics; and
   in response to a triggering of a monitor task, performing further actions, including:
      determining one or more control objects that are associated with the triggered monitor task; and
      executing one or more workflow tasks based on the one or more control objects.

24. A network computer for managing data, comprising:
   a transceiver that communicates over the network;
   a memory that stores at least instructions; and
   one or more processors that execute instructions that perform actions, including:
      providing a program model that includes a plurality of requirements for complying with a compliance program and a plurality of control objects, wherein each control object is associated with one or more of the plurality of requirements, one or more tasks, and one or more proof assets;

providing a machine learning engine to execute the one or more tasks to perform further actions, including:
generating one or more requests to classify each proof asset that is associated with the plurality of control objects;
validating each classified proof asset based on one or more of scores associated with a strength of its classification and the plurality of control objects that are associated with the each classified proof asset;
determining one or more completed control objects based on the one or more validated proof assets;
employing geolocation information provided by a global positioning system (GPS) device to select one or more of a time zone, language, currency, or calendar formatting for use in localizing one or more of documents, asset classification, user interfaces, reports, internal processes, or databases;
employing an amount of the completed control objects that is equivalent to a total amount of the plurality of the control objects to provide a report indicating that the plurality of requirements associated with the program model are satisfied, wherein the report is localized for a user based on the geolocation information; and
employing detection of one or more modifications to the one or more validated proof assets to perform further actions, including:
redetermining each of the one or more completed control objects that are affected by the one or more modifications to be an uncompleted control object; and
re-executing each task associated with each uncompleted control object, wherein the re-executing includes restarting one or more tasks associated with those modified proof assets that are associated with one or more uncompleted control objects.

25. The network computer of claim 24, wherein detection of the one or more modifications to the one or more validated proof assets, further comprises determining a portion of the plurality of control objects that are associated with one or more modified proof assets based on an asset catalog that is associated with each of the plurality of control objects.

26. The network computer of claim 24, wherein the one or more processors execute instructions that perform action further comprising:
collecting one or more documents based on the one or more generated requests, wherein the one or more documents correspond to one or more requests to collect proof assets;
employing one or more classifiers to categorize the one or more documents based on one or more characteristics of the one or more documents; and
associating the one or more documents with one or more control objects based on the categorization.

27. The network computer of claim 24, wherein validating each classified proof asset,
further comprises:
providing one or more classified proof assets to one or more of one or more services or one or more users; and
validating the one or more classified proof assets based on an approval response from the one or more of one or more services or the one or more users.

28. The network computer of claim 24, wherein the one or more processors execute instructions that perform action further comprising:
automatically determining one or more control objects based on one or more characteristics of the plurality of requirements; and
including the one or more determined control objects in the plurality of control objects.

29. The network computer of claim 24, wherein the one or more processors execute instructions that perform action further comprising:
storing the one or more validated proof assets in a data store; and
automatically associating the one or more stored proof assets with one or more other control objects that are associated with another program model based on a match of the one or more stored proof assets and the one or more proof assets associated with the one or more other control objects.

30. The network computer of claim 24, wherein the one or more processors execute instructions that perform action further comprises, determining the program model based on a standards based compliance program, wherein the compliance program defines the plurality of requirements.

* * * * *